(12) United States Patent
Lee

(10) Patent No.: US 9,554,440 B2
(45) Date of Patent: Jan. 24, 2017

(54) DIMMABLE LED LIGHTING APPARATUS

(71) Applicant: Seoul Semiconductor Co., Ltd., Ansan-si (KR)

(72) Inventor: Keon Young Lee, Ansan-si (KR)

(73) Assignee: Seoul Semiconductor Co., Ltd., Ansan-si (KR)

( * ) Notice: Subject to any disclaimer, the term of this patent is extended or adjusted under 35 U.S.C. 154(b) by 2 days.

(21) Appl. No.: 14/570,666

(22) Filed: Dec. 15, 2014

(65) Prior Publication Data

US 2016/0105939 A1   Apr. 14, 2016

Related U.S. Application Data

(60) Provisional application No. 62/063,132, filed on Oct. 13, 2014.

(51) Int. Cl.
*H05B 33/08* (2006.01)
*H05B 37/02* (2006.01)

(52) U.S. Cl.
CPC ...... *H05B 33/0845* (2013.01); *H05B 33/0809* (2013.01); *H05B 33/089* (2013.01); *H05B 37/029* (2013.01)

(58) Field of Classification Search
CPC ............ H05B 33/0845; H05B 33/0809; H05B 33/089; H05B 37/029
USPC ........................................................ 315/201
See application file for complete search history.

(56) References Cited

U.S. PATENT DOCUMENTS

| | | | |
|---|---|---|---|
| 2010/0327761 A1* | 12/2010 | Jin ..................... | H05B 41/2828 315/219 |
| 2011/0266968 A1* | 11/2011 | Bordin ............... | H05B 33/0815 315/287 |
| 2012/0200229 A1* | 8/2012 | Kunst ................ | H05B 33/0815 315/186 |
| 2013/0271702 A1* | 10/2013 | Takahashi ........... | G02F 1/13306 349/69 |
| 2013/0300310 A1* | 11/2013 | Hu ..................... | H05B 33/0854 315/239 |
| 2013/0342121 A1* | 12/2013 | Matsumoto ............ | H05B 37/02 315/200 R |
| 2015/0359057 A1* | 12/2015 | Lee .................... | H05B 33/0818 345/691 |
| 2015/0382421 A1* | 12/2015 | Chowdhury ....... | H05B 33/0809 315/201 |

* cited by examiner

*Primary Examiner* — Dylan White
(74) *Attorney, Agent, or Firm* — H.C. Park & Associates, PLC

(57) ABSTRACT

A dimmable LED lighting apparatus including a power input unit generating drive voltage through rectification of received AC power and outputting the generated drive voltage to the drive controller, an insulation type signal transceiver receiving a pulse width modulation (PWM) signal output from a PWM dimmer and outputting the PWM signal to the drive controller, while electrically insulating the PWM dimmer from the drive controller, a first LED group to an nth LED group, n being a positive integer of 2 or greater, receiving the drive voltage and sequentially operating under control of the drive controller, and a drive controller controlling sequential operation of the first LED group to the nth LED group according to a voltage level of the drive voltage, determining a dimming level based on the received PWM dimming signal, and controlling dimming of the first LED group to the nth LED group based on the determined dimming level.

23 Claims, 14 Drawing Sheets

DIMMABLE LED LIGHTING APPARATUS

CROSS-REFERENCE TO RELATED APPLICATION

This application claims priority from and the benefit of U.S. Provisional Application No. 62/063,132, filed on Oct. 13, 2014, which is hereby incorporated by reference for all purposes as if fully set forth herein.

BACKGROUND

Field

The present invention relates to a dimmable smart light emitting diode (LED) lighting apparatus and, more particularly, to a plurality of dimmable LED lighting apparatuses directly connected to one dimmer.

Discussion of the Background

In recent years, a dimmable LED lighting apparatus is widely used. Such a dimmable LED lighting apparatus is composed of a dimmer and an LED lighting apparatus, and is configured to allow control of illuminance in response to a dimming signal from the dimmer. However, a typical dimmable LED lighting apparatus and/or an illumination system including such an LED lighting apparatus have various problems. Hereinafter, the problems of the typical dimmable LED lighting apparatus and/or the illumination system including such an LED lighting apparatus will be described.

First, in order to perform dimming control of a plurality of LED lighting apparatuses at the same time, an illumination system capable of simultaneously controlling dimming levels of the plurality of LED lighting apparatuses using a single dimmer is used in the related art. In such a typical illumination system, the dimmer is directly connected to the plurality of LED lighting apparatuses via a cable line. However, such a typical illumination system has problems as follows. First, since the dimmer is connected to the LED lighting apparatuses via the cable line, a dimming signal sent from the dimmer to the LED lighting apparatuses can be distorted due to influence of external noise and the like. Generally, such an illumination system employs a dimming signal at a relatively low voltage (for example, 0.4V~2V), the dimming signal can be negatively influenced by, particularly, surrounding noise. Second, connection between the dimmer and the LED lighting apparatuses via the cable line causes generation of electromagnetic waves during transmission of the dimming signal to the LED lighting apparatuses, thereby having a negative influence on the LED lighting apparatus. Third, since the plurality of LED lighting apparatuses is electrically connected to one dimmer via the cable line, it can be considered that the dimmer and the plurality of LED lighting apparatuses constitute a circuit. Accordingly, upon failure of a certain LED lighting apparatus among the plurality of LED lighting apparatuses, the entire illumination system stops to operate, and the other LED lighting apparatuses and the dimmer malfunction due to failure of the certain LED lighting apparatus.

Further, such a typical dimmable LED lighting apparatus has a problem in that, when a dimming signal is not sent from the dimmer to the LED lighting apparatus, the LED lighting apparatus does not operate. More specifically, when the dimmer malfunctions, when there is a problem in the connection line between the dimmer and the LED lighting apparatus, when there is a malfunction of an input terminal to which the dimming signal is input, and the like, the dimming signal is not supplied to the LED lighting apparatus. In this case, although there is no problem in terms of a lighting function of the LED lighting apparatus, the LED lighting apparatus does not operate. That is, when the dimming signal is not sent to the LED lighting apparatus for the aforementioned reasons, the LED lighting apparatus does not operate since the determined dimming level is 0%.

On the other hand, some typical LED lighting apparatuses are configured to have a jumper set to provide the dimming function or not to provide such function. Accordingly, this type of dimmable LED lighting apparatus is required to change jumper setting attached to a drive IC by disassembling the LED lighting apparatus in order to change setting as to use of the dimming function. As a result, this type of dimmable LED lighting apparatus does not allow easy setting as to use of the dimming function and is very difficult for an unskilled person to change jumper setting thereof.

On the other hand, demand for various and complicated functions of a lighting apparatus has been increasing in the related art. For example, in recent years, the lighting apparatus has been increasingly required to have a color temperature (CT) or correlated color temperature (CCT) control function that enables provision of various lighting conditions and circumstances through change of illuminance of light emitted from the lighting apparatus, rather than a simple lighting function which has been demanded in the related art. However, the aforementioned dimmable LED lighting apparatus is configured to control only light output, that is, illuminance, and thus fails to satisfy various consumer demands as described above.

Moreover, there is an increasing trend of integrally controlling a plurality of LED lighting apparatuses through integration of the plurality of LED lighting apparatuses into a monolithic LED illumination system. Representative examples of such integrated control illumination systems include a street lamp system, a tunnel lamp system, and the like. However, such LED illumination systems allow only simple on/off control of the LED lighting apparatuses or simultaneous illuminance control of all the LED lighting apparatuses, and cannot perform a systematically integrated control of the LED lighting apparatuses according to surrounding circumstances.

The present invention has been conceived to solve the aforementioned problems in the related art.

Exemplary embodiments of the present invention provide a dimmable LED lighting apparatus electrically insulated from a dimmer while allowing transmission and reception of dimming signals between the dimmable LED lighting apparatus and the dimmer such that failure of one LED lighting apparatus does not affect the other LED lighting apparatuses, thereby enabling normal operation of the other LED lighting apparatuses.

Exemplary embodiments of the present invention provide an LED lighting apparatus that can be normally operated at a maximum dimming level even upon failure of a dimmer or an interconnection line.

Exemplary embodiments of the present invention provide an LED lighting apparatus that can be normally operated at a maximum dimming level through simple manipulation in the case where a user does not want to use a dimming function.

Exemplary embodiments of the present invention provide a dimmable LED lighting apparatus capable of outputting various color temperatures through dimming control of LED groups.

Exemplary embodiments of the present invention provide a smart illumination system that includes a plurality of lighting apparatuses and is capable of performing individual dimming control of the lighting apparatuses in response to detection signals sent from a motion sensor and an illumination sensor.

The above and other objects and the following advantageous effects of the present invention can be achieved by features of the present invention, which will be described hereinafter.

In accordance with one aspect of the invention, a dimmable LED lighting apparatus includes: a power input unit generating drive voltage through rectification of received AC power and outputting the generated drive voltage to the drive controller; an insulation type signal transceiver receiving a pulse width modulation (PWM) signal output from a PWM dimmer and outputting the PWM signal to the drive controller, while electrically insulating the PWM dimmer from the drive controller; a first LED group to an nth LED group (n being a positive integer of 2 or higher) receiving the drive voltage and sequentially operating under control of the drive controller; and a drive controller controlling sequential operation of the first LED group to the nth LED group according to a voltage level of the drive voltage, determining a dimming level based on the received PWM dimming signal, and controlling dimming of the first LED group to the nth LED group based on the determined dimming level.

The drive controller may include an integrating circuit that receives the PWM dimming signal and outputs a dimming signal detected through integration of the received PWM dimming signal for a pulse period, and the drive controller may determine the dimming level based on an average voltage of the detected dimming signal.

The insulation type signal transceiver may include a light source that outputs light obtained through conversion of the PWM dimming signal from the PWM dimmer, and a photodetector that outputs an electrical signal obtained through conversion of the PWM dimming signal received in the form of light.

The insulation type signal transceiver may further include a noise filter that filters high frequency noise from the received PWM dimming signal.

The insulation type signal transceiver may further include a constant current control device that maintains current supplied to the light source at a constant level.

The insulation type signal transceiver may further include a reverse voltage protection diode that protects the LED lighting apparatus from reverse voltage applied thereto.

In accordance with another aspect of the invention, a dimmable LED lighting system includes: a PWM dimmer outputting a PWM dimming signal in response to a dimming level; and a plurality of dimmable LED lighting apparatuses as set forth above. Here, the plurality of dimmable LED lighting apparatuses is connected to the PWM dimmer.

In accordance with a further aspect of the invention, a dimmable LED lighting apparatus includes: a reverse pulse width modulation (PWM) dimmer receiving a dimming level and outputting a reverse PWM dimming signal by inverting the received dimming level; a power input unit generating drive voltage through rectification of received AC power and outputting the generated drive voltage to the drive controller; an insulation type signal transceiver receiving the reverse PWM dimming signal and outputting the reverse PWM dimming signal to the drive controller, while electrically insulating the reverse PWM dimmer from the drive controller;

a first LED group to an $n^{th}$ LED group (n being a positive integer of 2 or higher) receiving the drive voltage and sequentially operating under control of the drive controller; and a drive controller controlling sequential operation of the first LED group to the $n^{th}$ LED group according to a voltage level of the drive voltage, reinverting the received reverse PWM dimming signal into a PWM dimming signal, determining a dimming level based on the PWM dimming signal, and controlling dimming of the first LED group to the $n^{th}$ LED group based on the determined dimming level.

The drive controller may include an inverting circuit that outputs the PWM dimming signal by re-inverting the received reverse PWM dimming signal.

The inverting circuit may include a pull-up resistance and a clamping diode.

The inverting circuit may include an inverting amplifier.

The drive controller may include an integrating circuit that receives the PWM dimming signal and outputs a dimming signal detected through integration of the received PWM dimming signal for a pulse period, and the drive controller may determine the dimming level based on an average voltage of the detected dimming signal.

The insulation type signal transceiver may include a light source that outputs light obtained through conversion of the reverse PWM dimming signal from the reverse PWM dimmer, and a photodetector that outputs an electrical signal obtained through conversion of the reverse PWM dimming signal received in the form of light.

The insulation type signal transceiver may further include a noise filter that filters high frequency noise from the received reverse PWM dimming signal.

The insulation type signal transceiver may further include a constant current control device that maintains current supplied to the light source at a constant level.

The insulation type signal transceiver may further include a reverse voltage protection diode that protects the LED lighting apparatus from reverse voltage applied thereto.

In accordance with yet another exemplary embodiment of the invention, a dimmable LED lighting apparatus includes: a power input unit generating drive voltage through rectification of received AC power and outputting the generated drive voltage to the first lighting module and the second lighting module; an insulation type signal transceiver receiving a PWM dimming signal output from a PWM dimmer and outputting the PWM dimming signal to the first lighting module while electrically isolating the PWM dimmer from the first lighting module; a first lighting module receiving the drive voltage and the PWM dimming signal to perform illumination based on a dimming level; and a second lighting module receiving the drive voltage to perform illumination.

The first lighting module may include a first light emitting unit including at least one LED group; and a first drive controller sequentially driving the one or more LED groups of the first light emitting unit according to a voltage level of the received drive voltage, determining the dimming level based on the PWM dimming signal, and controlling dimming of the one or more LED groups of the first light emitting unit based on the determined dimming level, and the second lighting module may include a second light emitting unit including one or more LED groups and a second drive controller sequentially driving the one or more LED groups of the second light emitting unit according to a voltage level of the received drive voltage.

The first drive controller may include an integrating circuit that receives the PWM dimming signal and outputs a dimming signal detected through integration of the received PWM dimming signal for a pulse period. The first drive controller may determine the dimming level based on an average voltage of the detected dimming signal.

The insulation type signal transceiver may include a light source that outputs light obtained through conversion of the PWM dimming signal from the PWM dimmer, and a photodetector that outputs an electrical signal obtained through conversion of the PWM dimming signal received in the form of light.

A color temperature of the one or more LED groups of the first light emitting unit may be different from that of the one or more LED groups of the second light emitting unit.

The insulation type signal transceiver may further include a noise filter that filters high frequency noise from the received PWM dimming signal.

The insulation type signal transceiver may further include a constant current control device that maintains current supplied to the light source at a constant level.

The insulation type signal transceiver may further include a reverse voltage protection diode that protects the LED lighting apparatus from reverse voltage applied thereto.

In accordance with yet another aspect of the invention, a smart illumination system includes at least one sensor unit including one of a motion sensor and a photo-detection sensor; at least one dimming unit connected to the sensor unit and determining a dimming level based on a detection signal from the motion sensor or the photo-detection sensor and outputting a PWM dimming signal based on the dimming level; and at least one lighting module connected to the dimming unit and receiving the PWM dimming signal and AC power to determine the dimming level based on the PWM dimming signal and to perform illumination while controlling dimming according to the dimming level.

The dimming unit may transmit the PWM dimming signal to the at least one lighting module connected to the dimming unit. Here, the dimming unit may be electrically insulated from the at least one lighting module connected to the dimming unit.

The lighting module may include a light source that outputs light obtained through conversion of the PWM dimming signal from the PWM dimmer, and a photodetector that outputs an electrical signal obtained through conversion of the PWM dimming signal received in the form of light.

In accordance with yet another aspect of the invention, a dimmable LED lighting apparatus includes: a reverse dimmer receiving a dimming level and outputting a reverse dimming signal by inverting the received dimming level; a power input unit generating drive voltage through rectification of received AC power and outputting the generated drive voltage to the drive controller; an LED group receiving the drive voltage and operating under control of the drive controller; and a drive controller reinverting the received reverse dimming signal into a dimming signal, determining a dimming level based on the dimming signal, and controlling dimming of the LED group based on the determined dimming level.

In accordance with yet aspect of the invention, a dimmable LED lighting apparatus includes: a reverse pulse width modulation (PWM) dimmer receiving a dimming level and outputting a reverse PWM dimming signal by inverting the dimming level; a power input unit generating drive voltage through rectification of received AC power and outputting the generated drive voltage to the drive controller; an insulation type signal transceiver receiving the reverse PWM dimming signal and outputting the reverse PWM dimming signal to the drive controller, while electrically insulating the reverse PWM dimmer from the drive controller; an LED group receiving the drive voltage and operating under control of the drive controller; and a drive controller reinverting the received reverse PWM dimming signal into a PWM dimming signal, determining a dimming level based on the PWM dimming signal, and controlling dimming of the LED group based on the determined dimming level.

According to one exemplary embodiment of the invention, in the structure wherein a plurality of lighting apparatuses is directly connected to a dimmer, failure of one LED lighting apparatus does not affect the other LED lighting apparatuses, thereby enabling normal operation of the other LED lighting apparatuses.

According to another exemplary embodiment of the invention, the lighting apparatus may be turned on/off using an inverted dimming signal without application of a new dimming signal, whereby the lighting apparatus can be normally operated at a maximum dimming level even in the event where there is a problem in the dimmer or the interconnection line or when a user does not want to use a dimming function.

According to a further embodiment of the invention, illumination with various color temperatures may be realized through dimming control of only one of LED groups having different color temperatures in a single lighting apparatus.

According to yet another embodiment of the invention, an illumination system includes a plurality of lighting apparatuses, each of which is systemically associated with other lighting apparatuses while allowing individual dimming control based on various sensing data including surrounding objects or surrounding illuminance obtained using sensors therein, thereby improving illumination efficiency and user convenience.

DETAILED DESCRIPTION OF THE ILLUSTRATED EMBODIMENTS

Figure 1:
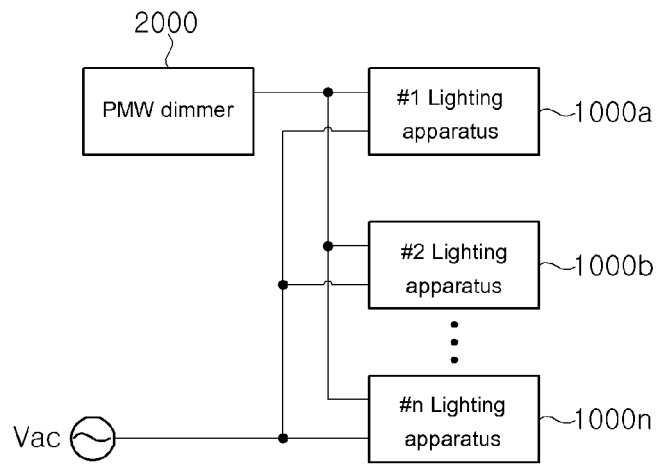
FIG. 1 is a schematic block diagram of a lighting lamp including a plurality of dimmable lighting apparatuses according to one exemplary embodiment of the invention.

The present invention will be described more fully hereinafter with reference to the accompanying drawings, in which exemplary embodiments of the present invention are illustrated. These exemplary embodiments will be described such that the invention can be easily realized by those skilled in the art. Here, although various exemplary embodiments are disclosed herein, it should be understood that these exemplary embodiments are not intended to be exclusive. For example, individual structures, elements or features of a particular exemplary embodiment are not limited to that particular exemplary embodiment and can be applied to other exemplary embodiments without departing from the spirit and scope of the invention. In addition, it should be understood that locations or arrangement of individual components in each of the exemplary embodiments may be changed without departing from the spirit and scope of the present invention. Therefore, the following exemplary embodiments are not to be construed as limiting the invention, and the present invention should be limited only by the claims and equivalents thereof. Like components having the same or similar functions will be denoted by like reference numerals.

Now, exemplary embodiments of the invention will be described in detail with reference to the accompanying drawings so as to be easily realized by those skilled in the art.

Exemplary Embodiments of the Invention

As used herein, the term "PWM dimmer" refers to a dimmer that outputs a pulse width modulated dimming signal having a wide pulse width modulated in proportion to a dimming level.

In addition, the term "reverse PWM dimmer" refers to a dimmer that outputs a pulse width modulated reverse PWM dimming signal having a pulse width modulated in inverse proportion to a dimming level, in which the pulse width of the reverse PWM dimming signal is narrowed with increasing dimming level. Although the dimming level is not limited to a particular dimming level, the dimming level may be classified into a minimum level (5%), a middle level (50%), and a maximum level (95%), and brightness of each LED group is controlled according to the dimming level.

Further, the term "LED group" refers to a group of light emitting diodes (or light emitting cells) connected to one another in series/parallel/series-parallel to be operated as a single unit under control of a drive IC (that is, to be turned on/off at the same time).

Further, the term "sequential driving" refers to a method of sequentially driving a plurality of LED groups by a drive IC, which drives light emitting diodes upon receiving an input voltage Vf or an input current ILED varying over time, such that the plurality of LED groups are sequentially turned on to emit light with increasing input voltage or input current, and are sequentially turned off with decreasing input voltage or input current.

Further, the term "light source" refers to a device that outputs light through conversion of an electrical signal, employs gallium, arsenic or a light emitting diode (LED), and is operated in association with a photodetector.

Further, the term "photodetector" refers to a device that outputs an electrical signal through conversion of light and generally employs a photodiode or a photo transistor.

Further, the term "constant current control device" refers to a device operated to allow constant current to flow even in a wide range of voltages supplied thereto, and means a current limiting diode (CLD) or a current regulating diode (CRD).

Further, the term "inverting circuit" refers to a circuit that outputs a voltage or current having an inverted phase with respect to that of an input voltage or current by inverting the phase of the received voltage or current.

Further, it should be noted that reference marks such as V1, V2, V3, . . . t1, t2, . . . , T1, T2, T3, and the like indicate certain voltages, certain time points, certain temperatures, and the like, and are used to indicate relative values instead of absolute values.

Overview of Illumination System

FIG. 1 is a schematic block diagram of an illumination system according to one exemplary embodiment of the invention. Referring to FIG. 1, the illumination system according to the exemplary embodiment outputs light from a plurality of LED lighting apparatuses 1000a~1000n by controlling brightness of the LED lighting apparatuses based on a dimming level selected by a user. The illumination system according to the exemplary embodiment may include a PWM dimmer 2000 and a plurality of lighting apparatuses 1000a~1000n connected to the PWM dimmer 2000.

According to this embodiment, the PWM dimmer 2000 outputs a PWM dimming signal by converting the selected dimming level into the PWM dimming signal.

In this embodiment, the plurality of LED lighting apparatuses 1000a~1000n are devices that receive the PWM dimming signal and AC voltage and outputs light having illuminance based on the dimming level, and are electrically insulated from the PWM dimmer.

Next, features and functions of individual LED lighting apparatuses according to exemplary embodiments will be described with reference to the accompanying drawings.

Figure 2:
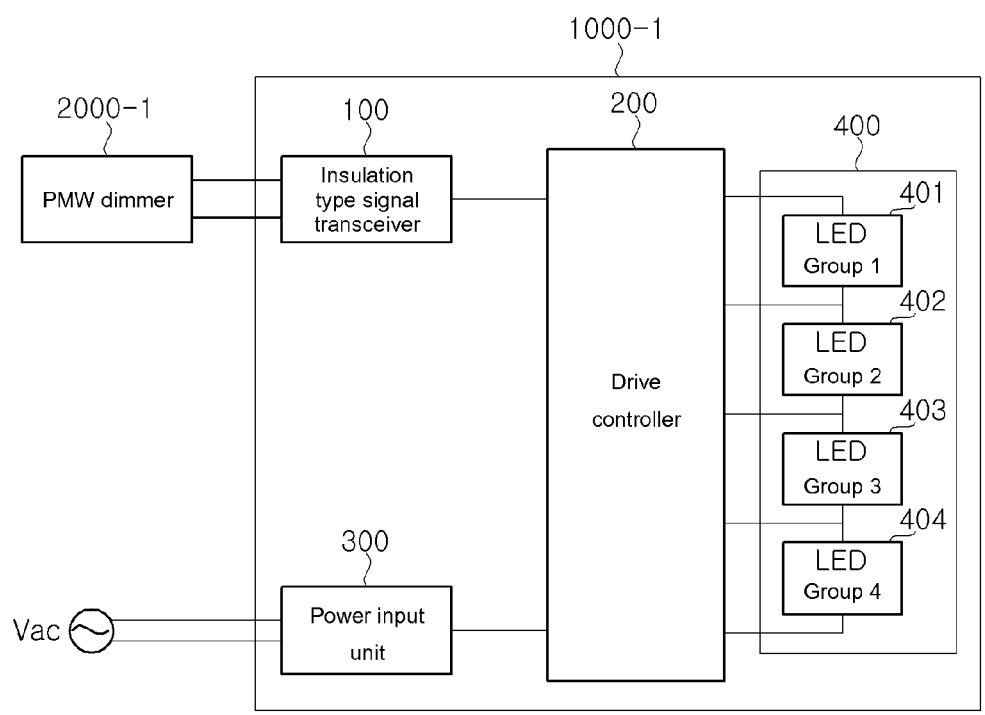
FIG. 2 is a schematic block diagram of a dimmable lighting apparatus according to one exemplary embodiment of the invention.
Figure 3:
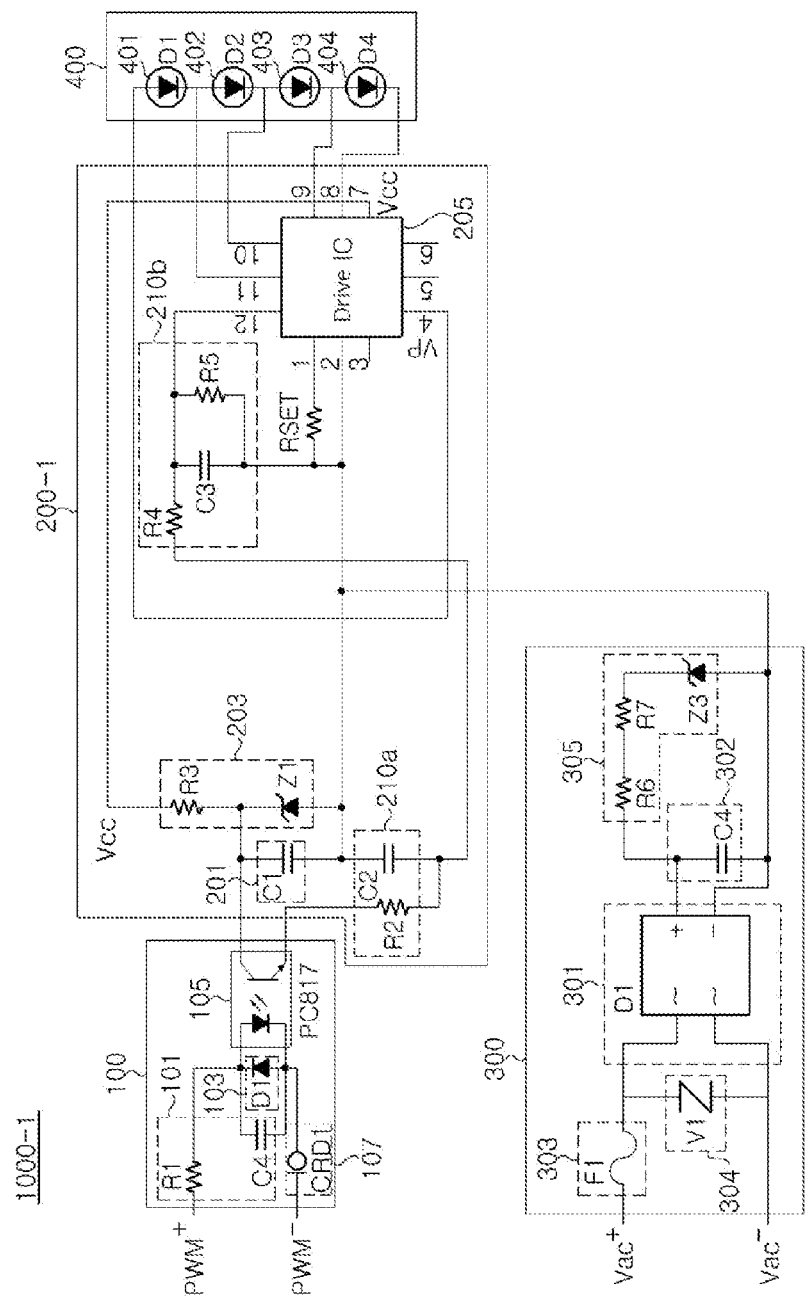
FIG. 3 is a circuit diagram of the dimmable lighting apparatus according to the exemplary embodiment of the invention.
Figure 4:
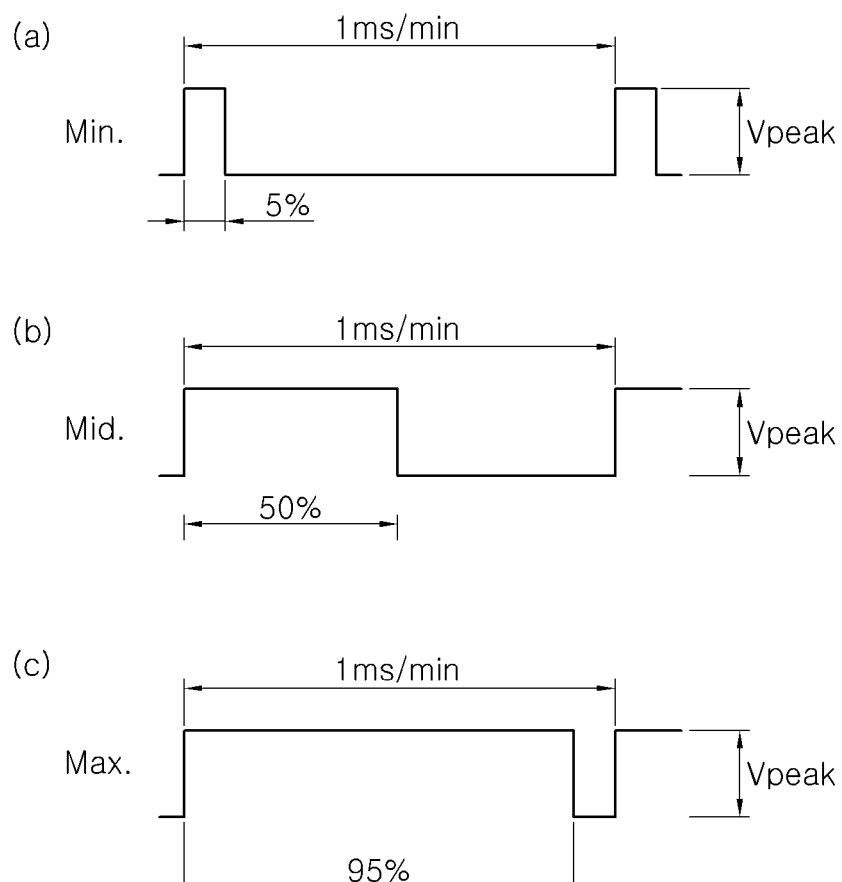
FIG. 4 is a waveform graph of a PWM dimming signal having a pulse width proportional to a dimming level according to one exemplary embodiment of the invention.

Features and Functions of LED Lighting Apparatus 1000-1 Insulated from PWM Dimmer FIG. 2 is a schematic block diagram of a dimmable lighting apparatus according to one exemplary embodiment of the invention, FIG. 3 is a circuit diagram of the dimmable lighting apparatus according to the exemplary embodiment of the invention, and FIG. 4 is a waveform graph of a PWM dimming signal having a pulse width proportional to a dimming level according to one exemplary embodiment of the invention. Hereinafter, referring to FIG. 2 to FIG. 4, the features and functions of an LED lighting apparatus 1000-1 according to one exemplary embodiment of the invention will be described.

First, the LED lighting apparatus 1000-1 according to the exemplary embodiment is a dimmable lighting apparatus that receives a dimming signal and AC voltage and outputs light having various illuminances according to the dimming level. To this end, the LED lighting apparatus 1000-1 according to this exemplary embodiment may include an insulation type signal transceiver 100, a drive controller 200-1, a power input unit 300, and a plurality of LED groups 400, as shown in FIGS. 2 and 3.

In the LED lighting apparatus 1000-1 according to this exemplary embodiment, the dimming signal may be a PWM dimming signal output from a PWM dimmer 2000-1 according to a dimming level selected by a user. The PWM dimming signal is a pulse width-modulated dimming signal having a pulse wave of a square waveform modulated according to the dimming level. A waveform of the PWM dimming signal is shown in FIG. 4. And the PWM dimming signal may have, for example, a frequency of 1 kHz and a peak value of 5V to 24V. In addition, FIG. 4(*a*) shows a PWM waveform having a duty ratio of 5% in order to indicate a minimum value of the dimming level, FIG. 4(*b*) shows a PWM waveform having a duty ratio of 50% in order to indicate a middle value of the dimming level, and FIG. 4(*c*) shows a PWM waveform having a duty ratio of 95% in order to indicate a maximum value of the dimming level. However, it should be understood that the invention is not limited thereto and the embodiments are provided for illustration only.

The power input unit 300 according to this exemplary embodiment receives AC voltage Vac from an external power source and rectifies the received AC voltage Vac to supply a drive voltage Vp to the drive controller 200-1 and the plurality of LED groups 400. To this end, the power input unit 300 according to this exemplary embodiment includes a fuse 303, an anti-surge circuit 304, a rectifier 301, a noise filter 302, and a voltage limiting circuit 305.

According to this exemplary embodiment, the fuse 303 and the anti-surge circuit 304 suppress or prevent breakdown of the lighting apparatus 1000-1 due to overvoltage or overcurrent.

In addition, the rectifier 301 according to this exemplary embodiment rectifies the received AC voltage Vac into drive voltage Vp (rectification can be full-wave rectification or half-wave rectification).

Further, the noise filter 302 according to this exemplary embodiment filters high frequency noise due to external influence from the AC voltage Vac.

Further, the voltage limiting circuit 305 according to this exemplary embodiment limits the drive voltage Vp to a predetermined voltage or less to be applied to the drive controller 200-1.

According to the exemplary embodiment, the plurality of LED groups 400 are sequentially turned on with increasing drive voltage Vp and sequentially turned off with decreasing drive voltage Vp under control of the drive controller 200-1. Referring to FIG. 2 and FIG. 3, the plurality of LED groups 400 is composed of four LED groups 401~404. However, it should be understood that the present invention is not limited thereto and the LED groups 400 may be composed of a single or n LED groups (n being an integer of 2 or higher).

Features and Functions of Insulation Type Signal Transceiver 100

Referring to FIGS. 2 and 3, the insulation type signal transceiver 100 is placed at an input terminal of the LED lighting apparatus 1000-1. According to one exemplary embodiment, the insulation type signal transceiver 100 placed at the input terminal of the LED lighting apparatus 1000-1 supplies the PWM dimming signal sent from the PWM dimmer 2000-1 to the drive controller 200-1, while electrically insulates the PWM dimmer 2000-1 from the drive controller 200-1. Consequently, the PWM dimmer is electrically insulated from the LED lighting apparatus 1000-1 by the insulation type signal transceiver 100. To this end, the insulation type signal transceiver 100 according to the exemplary embodiment may include a photocoupler 105.

The insulation type signal transceiver 100 according to the exemplary embodiment may include the photocoupler 105 in order to electrically insulate the LED lighting apparatus 1000-1 from the PWM dimmer 2000-1. To this end, the photocoupler 105 according to one exemplary embodiment may include a light source and a photodetector. The light source is a device which receives an electrical signal in the form of a PWM dimming signal and converts the PWM dimming signal into light and may employ gallium, arsenic or an LED, and the photodetector receives the PWM dimming signal provided in the form of light and converts the light into an electrical signal. The photodetector may employ a photodiode or a photo transistor, without being limited thereto.

According to another exemplary embodiment of the invention, the insulation type signal transceiver 100 may remove high frequency noise from the received PWM dimming signal. To this end, the insulation type signal transceiver 100 according to this exemplary embodiment may further include a noise filter 101. More specifically, since the PWM dimming signal has a relatively low voltage range of, for example, 0.4V to 2V, the PWM dimming signal can be negatively influenced by surrounding noise. Surrounding noise is generated in the form of high frequency noise may negatively influence the dimming signal, and the influenced dimming signal can cause damage and malfunction of the LED lighting apparatus 1000-1. Thus, it is desirable that the high frequency noise be removed from the dimming signal. To this end, the noise filter 101 is provided to the input terminal of the insulation type signal transceiver 100. Referring to FIG. 3, the noise filter 101 may include a resistor R1 and a capacitor C4, and provides a function of a low pass filter that attenuates high frequency noise of the PWM dimming signal. Such a noise filter may be realized by any well-known technique in the art and a detailed description thereof will be omitted.

According to a further exemplary embodiment of the invention, the insulation type signal transceiver 100 may be configured to perform constant current control of the PWM dimming signal. To this end, the insulation type signal transceiver 100 according to this exemplary embodiment may further include a constant current control device 107. More specifically, the PWM dimming signal may have various voltage peaks (for example, in the range of 5V to 24V), the insulation type signal transceiver 100 according to the exemplary embodiment is required to perform constant current control of current in order to supply the same amount of current in any cases. The constant current control device 107 prevents an output voltage of the PWM dimmer from being restricted to rated voltage of the LED lighting apparatus 1000-1 connected thereto. In addition, the constant current control device 107 enables a plurality of LED lighting apparatuses 1000-1 not to be restricted to certain type of connection by maintaining the current flowing in the individual LED lighting apparatuses 1000-1 at a constant level even when the LED lighting apparatuses 1000-1 are connected to each other in any type of series/parallel connection. Referring to FIG. 3, the constant current control device 107 according to the embodiment may include a single current regulator diode (CRD)/current regulator field.

According to yet another exemplary embodiment of the invention, the insulation type signal transceiver 100 may protect the circuit of the lighting apparatus from damage caused by reverse voltage. To this end, the insulation type signal transceiver 100 according to this exemplary embodiment may further include a reverse voltage protection diode 103. More specifically, when terminals of the PWM dimmer are connected in reverse, reverse voltage can be applied to the circuit, thereby causing malfunction and damage to the entire circuit. The reverse voltage protection diode 103 protects the circuit from the reverse voltage. Referring to FIG. 3, the reverse voltage protection diode 103 according to one exemplary embodiment may include a diode D1.

Features and Functions of Drive Controller 200-1

Referring to FIG. 3, the LED lighting apparatus 1000-1 according to the exemplary embodiment may include the drive controller 200-1. According to the exemplary embodiment, the drive controller 200-1 controls sequential driving of a plurality of LED groups 400 based on drive voltage Vp input through the power input unit 300. In addition, the drive controller 200-1 according to the exemplary embodiment may control intensity of light emitted from the plurality of LED groups 400 according to a dimming level selected by a user through detection of the dimming level using the PWM dimming signal input through the insulation type signal transceiver 100. To this end, the drive controller 200-1 according to the exemplary embodiment may include a drive IC 205.

The drive controller 200-1 according to the exemplary embodiment may include the drive IC 205 that controls sequential driving and illuminance of the plurality of LED groups through control of LED drive current ILED. The drive IC 205 according to the exemplary embodiment may control sequential driving of the plurality of LED groups 400 according to the drive voltage Vp such that the plurality of LED groups 400 are sequentially turned on or turned off, and may determine the received dimming level based on the received PWM dimming signal. In addition, the drive IC 205 according to the exemplary embodiment may adjust illuminance of the plurality of LED groups 400 based on the determined dimming level. As shown in FIG. 4, illuminance may be classified into, for example, a minimum level (5%), a middle level (50%), and a maximum level (95%), without being limited thereto.

According to one exemplary embodiment, the drive controller 200-1 may integrate the received PWM dimming signal of a square waveform for a pulse period thereof to detect an analog dimming signal Adim of a linear waveform, and may determine the dimming level based on the detected analog dimming signal. To this end, the drive controller 200-1 according to this exemplary embodiment may include integrating circuits 210a, 210b. The drive controller 200-1 according to this exemplary embodiment may receive the detected analog dimming signal Adim through the integrating circuits 210a, 210b to determine a user input dimming level based on the peak value of the dimming signal Adim. Referring to FIG. 3, the integrating circuits 210a, 210b according to this exemplary embodiment may include primary and secondary integrating circuits. However, it will be apparent to those skilled in the art that the present invention is not limited thereto and the integrating circuit may be composed only of a single integrating circuit through adjustment of time constant.

The drive controller 200-1 according to the exemplary embodiment may be provided at an input terminal thereof with a noise filter 201 that removes noise caused by external influence from the PWM dimming signal input through the insulation type signal transceiver 100. Referring to FIG. 3, the noise filter 201 according to one exemplary embodiment may include a single capacitor C1.

Further, the drive controller 200-1 according to the exemplary embodiment may limit drive voltage Vp to a predetermined value or less when the drive voltage Vp is supplied to the photocoupler 105 of the insulation type signal transceiver 100. To this end, the drive controller 200-1 according to the exemplary embodiment may include a voltage limiting circuit 203. More specifically, since there is a possibility of malfunction of elements of the photocoupler 105 upon application of an excessively high voltage to the photocoupler 105, the drive controller 200-1 includes the voltage limiting circuit 203 to allow application of an operable range of voltage to the photocoupler 105 by limiting the drive voltage Vp. To this end, referring to FIG. 3, the voltage limiting circuit 203 according to one exemplary embodiment of the invention may include a resistor R3 and a Zener diode Z1.

Example of Operation of LED Lighting Apparatus 1000-1 Insulated from PWM Dimmer

Next, referring to FIG. 1 or FIG. 2, an example of operation of the LED lighting apparatus 1000-1 insulated from the PWM dimmer will be described.

In normal operation, the drive controller 200-1 sequentially drives the plurality of LED groups 400 to emit light with predetermined illuminance. The lighting apparatus 1000-1 receives AC voltage, which in turn is rectified into drive voltage Vp through the power input unit 300, whereby the rectified drive voltage Vp is supplied to the lighting apparatus 1000-1. The drive IC 205 controls sequential driving of the light emitting diodes by sequentially turning on the light emitting diodes with gradually increasing drive voltage Vp, and sequentially turning off the light emitting diodes with gradually decreasing drive voltage Vp.

In operation of the lighting apparatus 1000-1, when a user manipulates a switch of the PWM dimmer 2000-1 after selecting a dimming level, the PWM dimmer 2000-1 outputs a PWM dimming signal. The PWM dimming signal has a square waveform and is a pulse width-modulated dimming signal, the pulse width of which is modulated to be widened with increasing dimming level and to be narrowed with decreasing dimming level.

The insulation type signal transceiver 100 according to the exemplary embodiment receives the PWM dimming signal output from the PWM dimmer 2000-1. The PWM dimming signal is converted into light by the light source of the and transmitted to the photodetector. Here, the constant current control device 107 performs constant current control to maintain the current flowing in the circuit at a constant level even in the case where a peak voltage of the PWM dimming signal is arbitrarily changed. The reverse voltage protection diode 103 protects the circuit from reverse voltage input from the PWM dimmer in the case where terminals of the PWM dimmer are connected in reverse. The PWM dimming signal having passed through the insulation type signal transceiver 100 is input to the drive controller 200-1. As such, since transmission and reception of the PWM dimming signal between the drive controller 200-1 and the PWM dimmer 2000-1 is realized by light, the PWM dimmer 2000-1 is electrically isolated from the drive controller 200-1. Consequently, although the PWM dimmer 2000-1 is connected to the lighting apparatus 1000-1 (or directly to a plurality of lighting apparatuses 1000a~1000n), the PWM dimmer is electrically isolated therefrom.

The drive controller 200-1 according to the exemplary embodiment receives the PWM dimming signal transmitted from the insulation type signal transceiver 100. The received PWM dimming signal is integrated through the integrating circuits 210a, 210b to provide an analog dimming signal Adim, which in turn is input to the drive IC 205. The drive IC 205 determines the dimming level based on the analog dimming signal Adim. The drive IC 205 adjusts illuminance of the LEDs by controlling LED drive current $I_{LED}$ according to the determined dimming level.

Then, the lighting apparatus 1000-1 according to the exemplary embodiment outputs light with adjusted illuminance based on the dimming level until a new dimming level selected by a user is input thereto.

In the above description, referring to FIG. 2 and FIG. 3, the technical features of the present invention, that is, the technical features of electrically insulating the dimmer from the LED lighting apparatus have been described with reference to the sequential driving type LED lighting apparatus. However, it should be noted that the present invention is not limited to such embodiments. That is, irrespective of a driving type, the aforementioned technical features of the present invention may be applied to any LED lighting apparatuses subjected to dimming control in response to a dimming signal sent from the dimmer, and it will be apparent to those skilled in the art that such various exemplary embodiments fall within the scope of the present invention.

Figure 5:
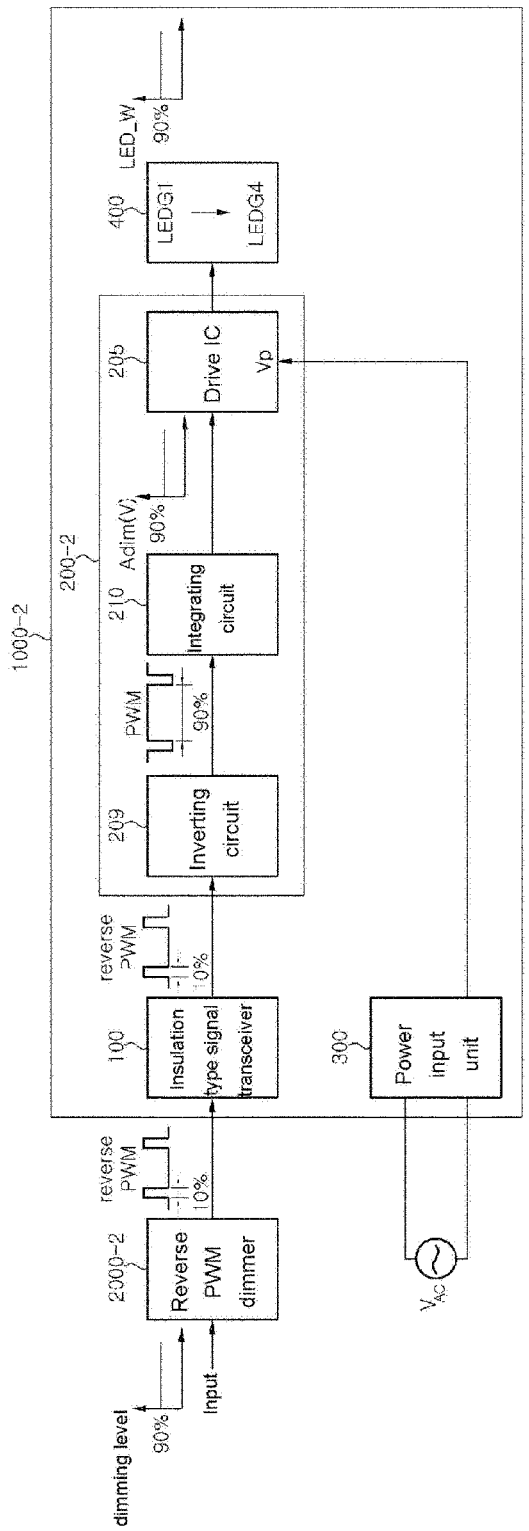
FIG. 5 is a schematic block diagram of a dimmable lighting apparatus, which further includes a reverse PWM dimmer and an inverting circuit, according to one exemplary embodiment of the invention.
Figure 6A:
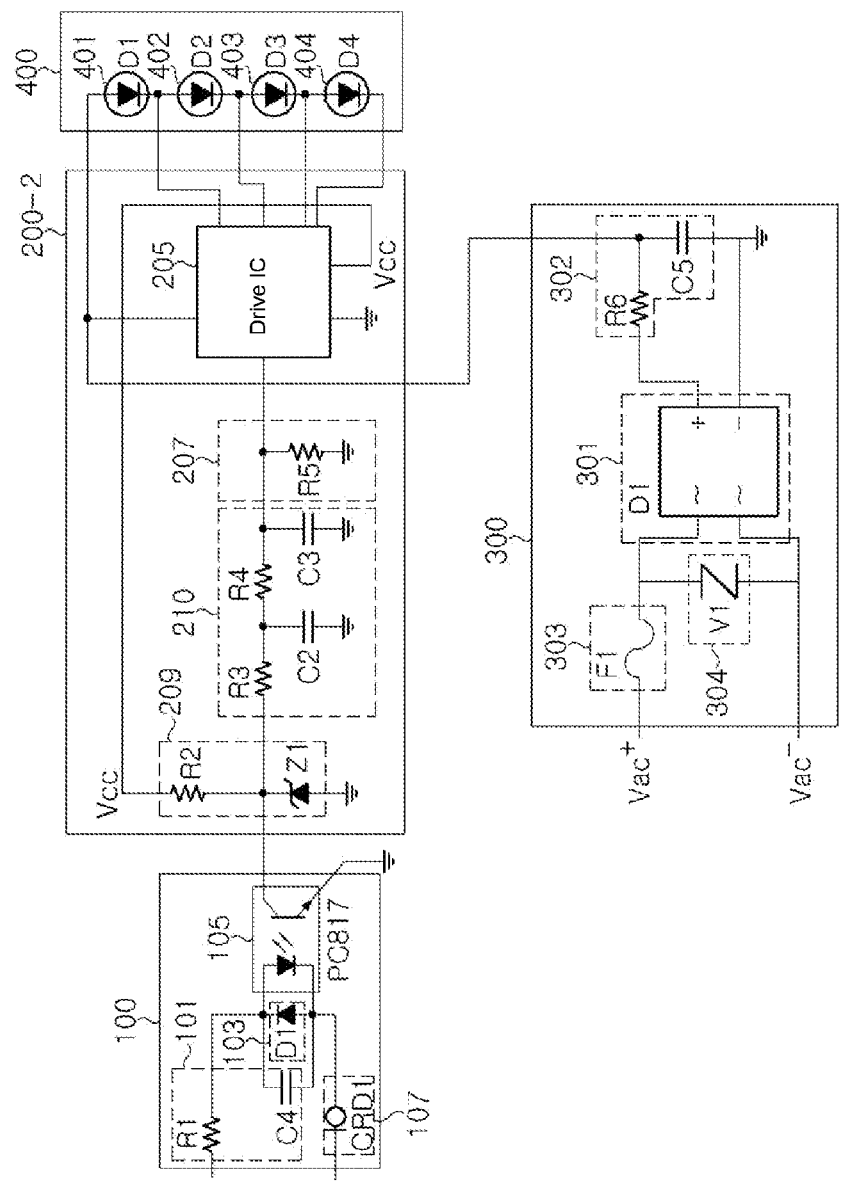
FIG. 6a is a circuit diagram of the dimmable lighting apparatus, which further includes the reverse PWM dimmer and the inverting circuit, according to the exemplary embodiment of the invention.
Figure 6B:
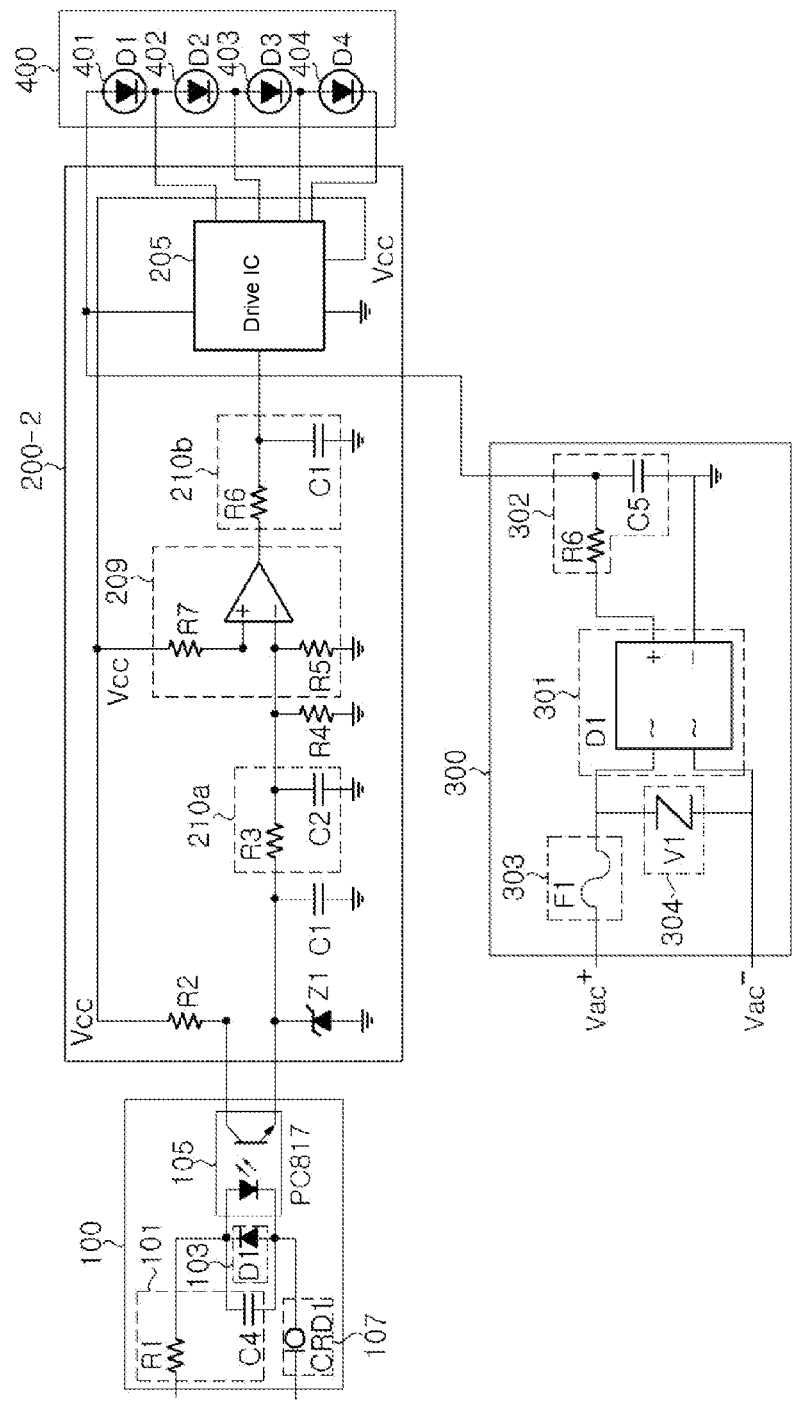
FIG. 6b is a circuit diagram of the dimmable lighting apparatus, which further includes a reverse PWM dimmer and an inverting circuit using an inverting amplifier, according to the exemplary embodiment of the invention.
Figure 7:
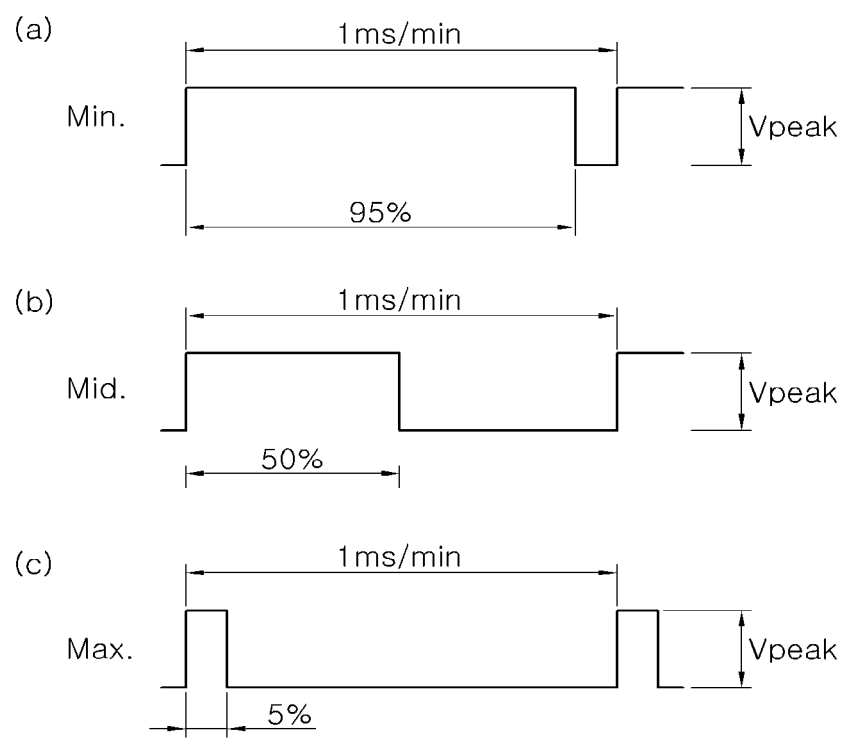
FIG. 7 is a waveform graph of a reverse PWM dimming signal having a pulse width inversely proportional to a dimming level according to one exemplary embodiment of the invention.

Features and Functions of LED Lighting Apparatus 1000-2 Using Reverse PWM Dimming Signal by Inverting Reverse PWM Dimming Signal FIG. 5 is a schematic block diagram of a dimmable lighting apparatus, which further includes a reverse PWM dimmer and an inverting circuit, according to one exemplary embodiment of the invention; FIGS. 6a and 6b are circuit diagrams of the dimmable lighting apparatus, which further includes the reverse PWM dimmer and the inverting circuit, according to the exemplary embodiment of the invention; and FIG. 7 is a waveform graph of a reverse PWM dimming signal having a pulse width inversely proportional to a dimming level according to one exemplary embodiment of the invention. Next, features and functions of an LED lighting apparatus 1000-2 according to one exemplary embodiment of the invention will be described with reference to FIG. 5 to FIG. 7.

First, the LED lighting apparatus 1000-2 according to the exemplary embodiment is a dimmable lighting apparatus that receives a reverse PWM dimming signal and AC voltage and outputs light having various illuminances according to a dimming level detected based on the reverse PWM dimming signal. According to one exemplary embodiment of the invention, the LED lighting apparatus 1000-2 may normally operate at a maximum dimming level even in the event where a dimming signal is not input due to failure of a reverse PWM dimmer 2000-2, an interconnection line between the reverse PWM dimmer 2000-2 and the LED lighting apparatus 1000-2, an input terminal through which the dimming signal is input, and the like. In addition, when a user does not want to use a dimming function, the LED lighting apparatus may be normally operated at the maximum dimming level by preventing output of the reverse PWM dimming signal without changing setting of a jumper. To this end, the LED lighting apparatus 1000-2 according to the exemplary embodiment may include a reverse PWM dimmer 2000-2, an insulation type signal transceiver 100, a drive controller 200-2, a power input unit 300, and a plurality of LED groups 400.

The reverse PWM dimmer 2000-2 according to the exemplary embodiment outputs a reverse PWM dimming signal according to a dimming level. The reverse PWM dimming signal is a pulse width-modulated dimming signal having a pulse wave of a square waveform, which is modulated according to the dimming level such that the pulse wave of the dimming signal is narrowed with increasing dimming level and is widened with decreasing dimming level. FIG. 7 shows a waveform of the reverse PWM dimming signal. Comparing the PWM dimming signal of FIG. 4 with the reverse PWM dimming signal of FIG. 7, both FIG. 4(*a*) and FIG. 7(*a*) show minimum dimming levels, in which the PWM dimming signal shown in FIG. 4(*a*) has a pulse width with a duty ratio of 5% and the reverse PWM dimming signal of FIG. 7(*a*) has a pulse width with a duty ratio of 95%. In addition, both FIG. 4(*b*) and FIG. 7(*b*) show middle dimming levels, in which each of the PWM dimming signal and the reverse PWM dimming signal shown in FIG. 4(*a*) and FIG. 7(*b*) has a pulse width with a duty ratio of 50%. Further, FIG. 4(*c*) and FIG. 7(*c*) show maximum dimming levels, in which the PWM dimming signal shown in FIG. 4(*c*) has a pulse width with a duty ratio of 95% and the reverse PWM dimming signal shown in FIG. 7(*c*) has a pulse width with a duty ratio of 5%. That is, the PWM dimming signal of FIG. 4 is a dimming signal modulated such that the pulse width of the dimming signal is widened with increasing dimming level and is narrowed with decreasing dimming level, and the reverse PWM dimming signal of FIG. 7 is a dimming signal obtained by inverting the PWM dimming signal of FIG. 4 (to have a phase difference of 180 degrees) such that the pulse width of the dimming signal is narrowed with increasing dimming level and is widened with decreasing dimming level.

The insulation type signal transceiver 100 according to the exemplary embodiment is placed at an input terminal of the lighting apparatus 1000-2 and outputs the reverse PWM dimming signal to the drive controller 200-2 while electrically insulating the reverse PWM dimmer 2000-2 from the drive controller 200-2. Consequently, the reverse PWM dimmer 2000-2 is electrically insulated from the lighting apparatus 1000-2 by the insulation type signal transceiver 100. To this end, referring to FIGS. 6a and 6b, the insulation type signal transceiver 100 according to these exemplary embodiments may include a noise filter 101, a reverse voltage protection diode 103, a constant current control device 107, and a photocoupler 105 composed of a light source and a photodetector. The insulation type signal transceiver 100 has the same structure as that of the insulation type signal transceiver 100 of the lighting apparatus 1000-1 and thus a detailed description thereof will be omitted.

The power input unit 300 according to this exemplary embodiment receives AC voltage Vac from an external power source and rectifies the received AC voltage Vac to supply a rectified voltage to the drive controller 200-2 and a plurality of LED groups 400. To this end, referring to FIGS. 6a and 6b, the power input unit 300 according to these exemplary embodiments may include a fuse 303, an anti-surge circuit 304, and a rectifier 301. Description of the same components as those of the power input unit 300 of the lighting apparatus 1000-1 will be omitted.

The power input unit 300 according to this exemplary embodiment may further include a ripple filter 302 that removes remaining ripple components from the drive voltage immediately after rectification thereof.

In addition, the LED lighting apparatus 1000-2 according to the exemplary embodiment may include a plurality of LED groups 400. Referring to FIG. 5 and FIGS. 6a and 6b, the plurality of LED groups 400 is composed of four LED groups 401-404. However, it should be understood that the present invention is not limited thereto and the plurality of LED groups 400 may be composed of a single or n LED groups (n being an integer of 2 or higher).

The LED lighting apparatus 1000-2 according to this exemplary embodiment has many similar features to the aforementioned LED lighting apparatus 1000-1 and thus will be mainly described in terms of different points from those of the LED lighting apparatus 1000-1. The most significantly different feature between the LED lighting apparatuses 1000-1 and 1000-2 is the use of an inverted signal by the drive controllers 200-1, 200-2 and treatment of the inverted signal, if used.

Features and Functions of Drive Controller 200-2

Referring to FIG. 5 and FIGS. 6a and 6b, the features and functions of the drive controller 200-2 according to these exemplary embodiments will be described.

The drive controller 200-2 according to this exemplary embodiment controls sequential driving of the plurality of LED groups 400 based on drive voltage Vp input through the power input unit 300, and controls intensity of light emitted from the LED groups 400 according to a dimming level selected by a user through detection of the dimming level using a reverse PWM dimming signal input through the insulation type signal transceiver 100. To this end, referring to FIGS. 6a and 6b, the drive controller 200-2 according to these exemplary embodiments may include an inverting circuit 209, an integrating circuit 210, and a drive IC 205.

The drive controller 200-2 according to this exemplary embodiment may include the inverting circuit 209 that inverts the reverse PWM dimming signal input thereto. More specifically, the inverting circuit 209 according to one exemplary embodiment outputs a non-inverted PWM dimming signal as shown in FIG. 4 by reinverting the reverse PWM dimming signal input through the insulation type signal transceiver 100.

Referring to FIGS. 6a and 6b, the inverting circuit according to these exemplary embodiments may include a pull-up resistor R2 connected to a Vcc+ power source and a clamping diode Z1. The pull-up resistor R2 maintains a received signal in a logically high state, and the clamping diode Z1 allows a signal to be output to the clamping diode upon application of an excessively high or low voltage. More specifically, when a received signal has a voltage in a low state, voltage Vcc+ is applied to an output terminal of the inverting circuit 209, whereby the voltage of the signal becomes a high state. When the received signal has a voltage in a high state, it is determined that an excessively high voltage is applied, and the signal is sent to the clamping diode Z1, whereby the output terminal of the inverting circuit 209 outputs a voltage in a low state. Accordingly, the received reverse PWM dimming signal is inverted again through the inverting circuit 209 to be output as a PWM dimming signal as shown in FIG. 4.

According to another exemplary embodiment, the inverting circuit 209 may include an inverting amplifier that inverts only the phase of an input signal by 180 degrees, instead of the pull-up resistor R2 and the clamping diode Z1. This exemplary embodiment is shown in FIG. 6b.

Figure 10:
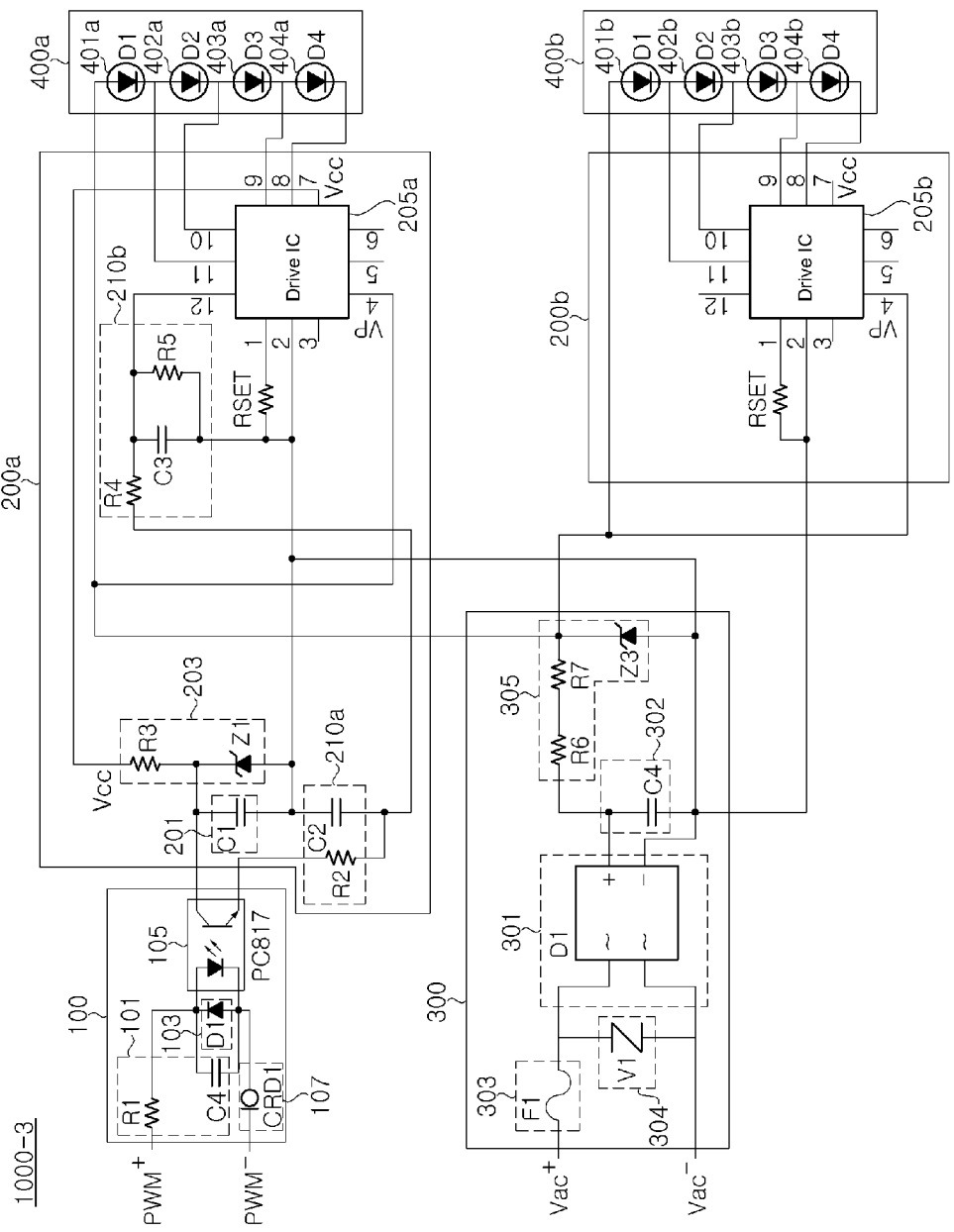
FIG. 10 is a circuit diagram of the lighting apparatus including two lighting modules according to the exemplary embodiment of the invention.

The drive controller 200-2 according to the exemplary embodiment may include the integrating circuit 210 which integrates the PWM dimming signal to detect an analog dimming signal Adim. Referring to FIG. 10, the integrating circuit 210 according to one exemplary embodiment is composed of primary and secondary integrating circuits using two resistors R3, R4 and two capacitors C2, C3. However, it will be apparent to those skilled in the art that the present invention is not limited thereto and the integrating circuit 210 may be composed only of a primary integrating circuit through adjustment of time constant.

The drive controller 200-2 according to the exemplary embodiment may include the drive IC 205 that controls sequential driving of the plurality of LED groups 400 and illuminance of LEDs through control of LED drive current $I_{LED}$. The drive IC 205 according to the exemplary embodiment has the same functions as those of the drive IC 205 of the LED lighting apparatus 1000-1 and detailed descriptions thereof will be omitted.

Further, referring to FIG. 6a, the drive controller 200-2 according to the exemplary embodiment may further include a resistor (R5) 207 to set a minimum LED drive current $I_{LED}$.

Example of Operation of the LED Lighting Apparatus 1000-2 Using Reverse PWM Dimming Signal Through Inversion of a Reverse PWM Dimming Signal.

Next, referring to FIGS. 5 and 6, one example of operation of the LED lighting apparatus 1000-2 insulated from the PWM dimmer and performing inversion of a reverse PWM dimming signal will be described.

(1) Case where Dimming Function is Used

In normal operation, the drive controller 200-2 sequentially operates the LED groups 400 to emit light with predetermined illuminance. Under control of the drive IC 205, the LED groups 400 are sequentially turned on or turned off as the voltage level of the drive voltage changes. The lighting apparatus 1000-2 receives AC voltage, which in turn is rectified into drive voltage Vp through the power input unit 300, whereby the rectified drive voltage Vp is supplied to the lighting apparatus 1000-2. The drive IC 205 controls sequential driving of the plurality of the LED groups 400 by sequentially turning on LEDs with gradually increasing drive voltage Vp, and sequentially turning off the LEDs with gradually decreasing drive voltage Vp.

When a user selects a dimming level by manipulating a switch of the reverse PWM dimmer 2000-2, the reverse PWM dimmer 2000-2 outputs a reverse PWM dimming signal. The reverse PWM dimming signal has a square waveform and is a pulse width-modulated dimming signal, the pulse width of which is modulated to be narrowed with increasing dimming level and to be widened with decreasing dimming level.

The insulation type signal transceiver 100 according to the exemplary embodiment transmits the reverse PWM dimming signal to drive controller 200-2 by converting the signal into the light through the light source and converting the light back to the reverse PWM dimming signal through the photodetector, while electrically insulating the reverse PWM dimmer from the drive controller 200-2. Consequently, the reverse PWM dimmer is electrically isolated from the lighting apparatus 1000-2. In addition, the insulation type signal transceiver 100 has functions such as noise filtering, protection against reverse voltage, constant current control, and the like.

The drive controller 200-2 according to the exemplary embodiment receives the reverse PWM dimming signal. The received reverse PWM dimming signal is reinverted by the inverting circuit 209 according to the exemplary embodiment. The integrating circuit 210 integrates the re-inverted PWM dimming signal for a pulse period to detect an analog dimming signal Adim, which in turn is input to the drive IC 205. The drive IC 205 according to the exemplary embodiment receives the detected analog dimming signal Adim and adjusts illuminance of the LEDs by controlling the LED drive current $I_{LED}$ according to the analog dimming signal Adim.

Then, the lighting apparatus 1000-2 according to the exemplary embodiment outputs light with adjusted illuminance based on the dimming level until a new dimming level selected by a user is input thereto.

(2) Upon Failure of Reverse PWM Dimmer 2000-2 and the Like

When failure of the reverse PWM dimmer 2000-2, a control line, or an input terminal of the LED lighting apparatus 1000-2 occurs, a reverse PWM dimming signal is not input to the LED lighting apparatus 1000-2. When there is no input of the reverse PWM dimming signal, it is regarded that a reverse PWM dimming signal having a duty ratio of 0% is input to the lighting apparatus, and the inverting circuit 209 inverts the reverse PWM dimming signal having a duty ratio of 0% to allow a PWM dimming signal having a maximum value to be input to the drive IC 205, whereby the LED lighting apparatus 1000-2 can be normally operated by receiving AC voltage Vac even upon failure of the reverse PWM dimmer and the like.

(3) Case where User does not want to Use Dimming Function

When a user does not want to use a dimming function, the reverse PWM dimming signal is not input to the LED lighting apparatus 1000-2 by turning off a power source of the reverse PWM dimmer 2000-2 or disconnecting an interconnection line of the LED lighting apparatus 1000-2. When there is no input of the reverse PWM dimming signal, it is regarded that a reverse PWM dimming signal having a duty ratio of 0% is input to the lighting apparatus, the inverting circuit 209 inverts the reverse PWM dimming signal having a duty ratio of 0% to allow a PWM dimming signal having a maximum value to be input to the drive IC 205, whereby the LED lighting apparatus 1000-2 can be normally operated by receiving AC voltage Vac even when the dimming function is not used.

In the above description, referring to FIG. 5 to FIG. 7, the technical features of the invention is using the reverse dimming signal have been described with reference to the lighting apparatus according to the exemplary embodiment, which includes the reverse PWM dimmer 2000-2 and the insulation type signal transceiver 100 for electrically insulating the reverse PWM dimmer 2000-2 from the drive controller 200-2. However, it will be apparent to those skilled in the art that the invention is not limited to this type of embodiment and that various exemplary embodiments including the technical features of the invention can be made without departing from the scope of the invention.

That is, according to the technical features of the invention described above with reference to FIG. 5 to FIG. 7, upon receiving a dimming level, the dimmer inverts the received dimming level to output a reverse dimming signal to the LED lighting apparatus, and then the LED lighting apparatus reinverts the received reverse dimming signal to recover an original dimming level, whereby dimming of the LED lighting apparatus can be controlled according to the recovered dimming level. It will be apparent to those skilled in the art that various embodiments including such technical features fall within the scope of the invention. For example, the aforementioned technical features of the invention may also be applied to a lighting apparatus employing an analog dimming signal instead of the PWM dimming signal. Further, as another example, the aforementioned technical features of the invention may also be applied to a dimming apparatus in which a dimmer is not electrically insulated from an LED lighting apparatus. Further, as another example, the aforementioned technical features of the invention may also be applied to an AC driving type or DC driving type LED lighting apparatus as well as the AC sequential driving type LED lighting apparatus.

Summary and Comparison of Typical Dimmable Lighting Apparatus in the Related Art and Dimmable Lighting Apparatuses According to Exemplary Embodiments FIG. 8a to FIG. 8d are schematic block diagrams of a typical dimmable lighting apparatus in the related art and dimmable lighting apparatuses according to exemplary embodiments of the invention, and waveform views of a dimming signal and light outputs of the lighting apparatuses. Now, referring to FIG. 8a to FIG. 8d, improved features of dimmable lighting apparatuses according to various exemplary embodiments of the invention will be summarized in brief. Hereinafter, assume that a dimming level of 90% is selected by a user and an analog dimming signal has a voltage in the range of 0V~10V throughout FIG. 8a to FIG. 8d.

Figure 8A:
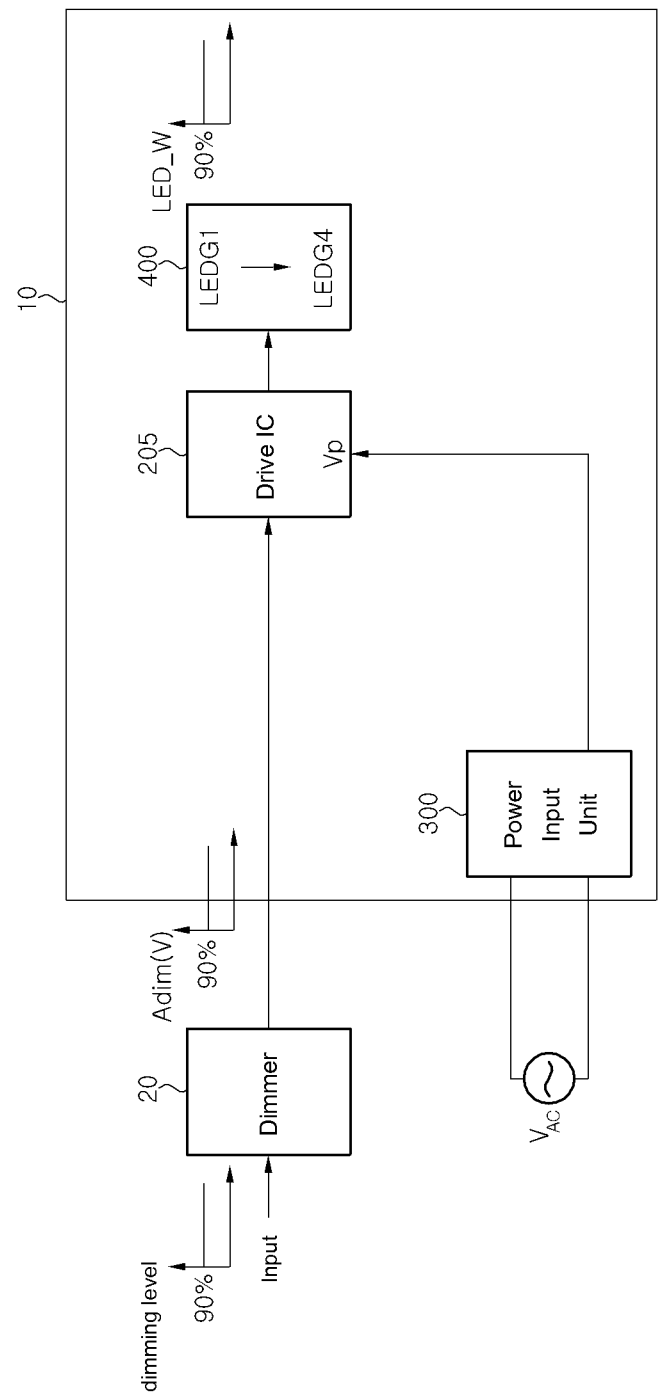
FIG. 8a to FIG. 8d are schematic block diagrams of a typical dimmable lighting apparatus in the related art and dimmable lighting apparatuses according to exemplary embodiments of the present invention, and waveform views of a dimming signal and light outputs of the lighting apparatuses.

First, FIG. 8a shows a block diagram of a typical dimmable lighting apparatus in the related art, waveform graphs of input/output signals for each component, and a light output waveform graph of the LED lighting apparatus. As shown in FIG. 8a, the typical dimmable lighting apparatus 10 is connected to a typical dimmer 20 and performs dimming control according to a dimming signal input from the dimmer 20. Here, the typical dimmer 20 is configured to generate an analog dimming signal (for example, in the range of 0V~10V) corresponding to a dimming level selected by a user, and to input the analog dimming signal to a drive IC 205. In this example, it is assumed that the analog dimming signal has a voltage in the range of 0V~10V and is in direct proportion to the dimming level (for example, when the dimming level is 90%, the analog dimming signal corresponding thereto has a voltage of 9V). As shown in FIG. 8a, when the analog dimming signal (having a voltage of 9V corresponding to the dimming level of 90%) output from the dimmer 20 is input to the drive IC 205, the drive IC 205 controls light output of the LED groups to 90% by adjusting the magnitude of LED drive current according to the received dimming signal.

Figure 8B:
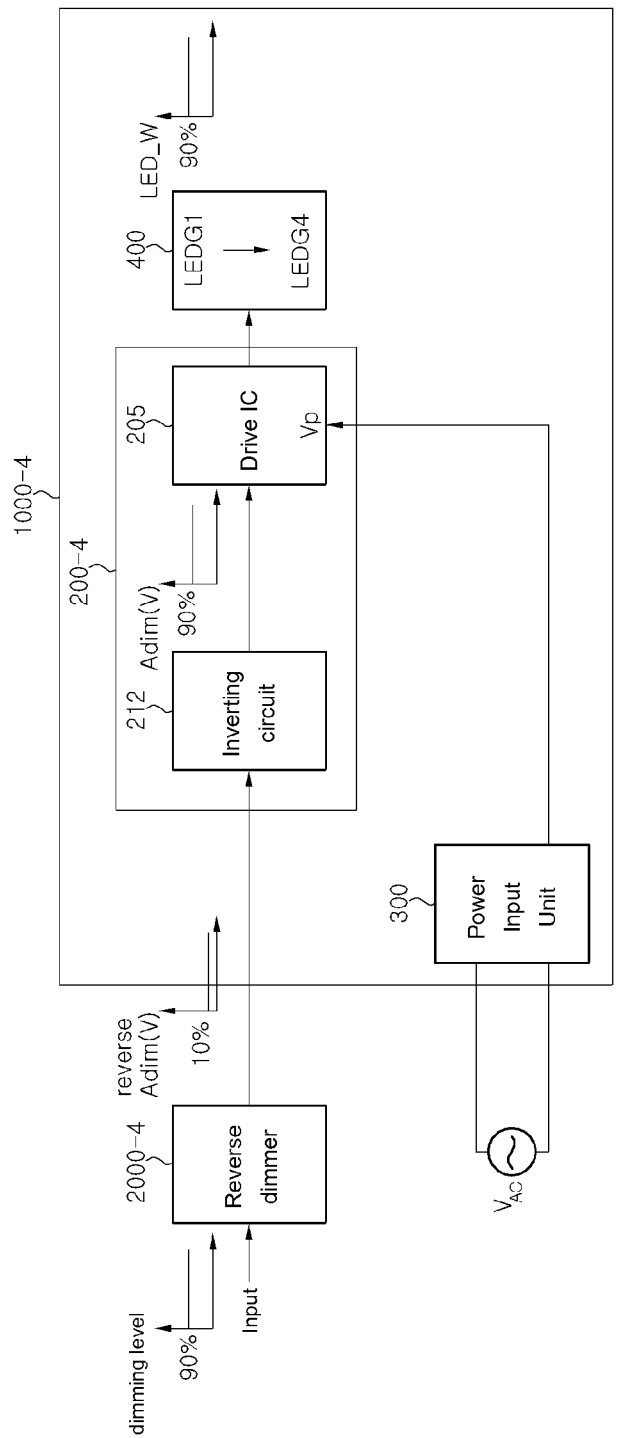

FIG. 8b shows a block diagram of a dimmable lighting apparatus according to one exemplary embodiment to which the technical features of using a reverse dimming signal described with reference to FIG. 5 to FIG. 7 are applied, waveform graphs of input/output signals for each component, and a light output waveform graph of the LED lighting apparatus. More specifically, the lighting apparatus 1000-4 according to the exemplary embodiment shown in FIG. 8b employs a reverse dimmer 2000-4, instead of the typical dimmer 20 as shown in FIG. 8a, and thus further includes an inverting circuit 212 in a drive controller 200-4 to perform re-inversion of a reverse dimming signal. That is, it can be regarded that the exemplary embodiment shown in FIG. 8b is the most fundamental exemplary embodiment configured to use the reverse dimming signal. As shown in FIG. 8b, in such an exemplary embodiment, the reverse dimmer 2000-4 is configured to generate and output a reverse dimming signal that is inversely proportional to a dimming level selected by a user. In this exemplary embodiment, the reverse dimmer 2000-4 is configured to output an analog dimming signal that is inversely proportional to the dimming level and has a voltage of 0V to 10V. However, it should be understood that the present invention is not limited thereto. Thus, as shown therein, when the selected dimming level is 90%, the reverse dimmer 2000-4 generates and outputs a reverse dimming signal of 1V to the drive controller 200-4 of the LED lighting apparatus 1000-4, and the inverting circuit 212 in the drive controller 200-4 reinverts and outputs the received reverse dimming signal to a drive IC 205. As shown therein, the inverting circuit 212 generates a dimming signal of 9V by reinverting the reverse dimming signal and outputs the dimming signal to the drive IC 205, upon receiving the reverse dimming signal of 1 V. Accordingly, the drive IC 205 receives the dimming signal of 9V proportional to the selected dimming level, thereby controlling dimming of the LED groups to a dimming level of 90%. In this exemplary embodiment, the inverting circuit 212 may be realized by any typical inverting circuit, such as an inverting amplifier, which is well known in the art. In this case, since the reverse dimming signal is not a PWM type signal, the inverting circuit using a pull-up resistor as described above cannot be used.

Figure 8C:
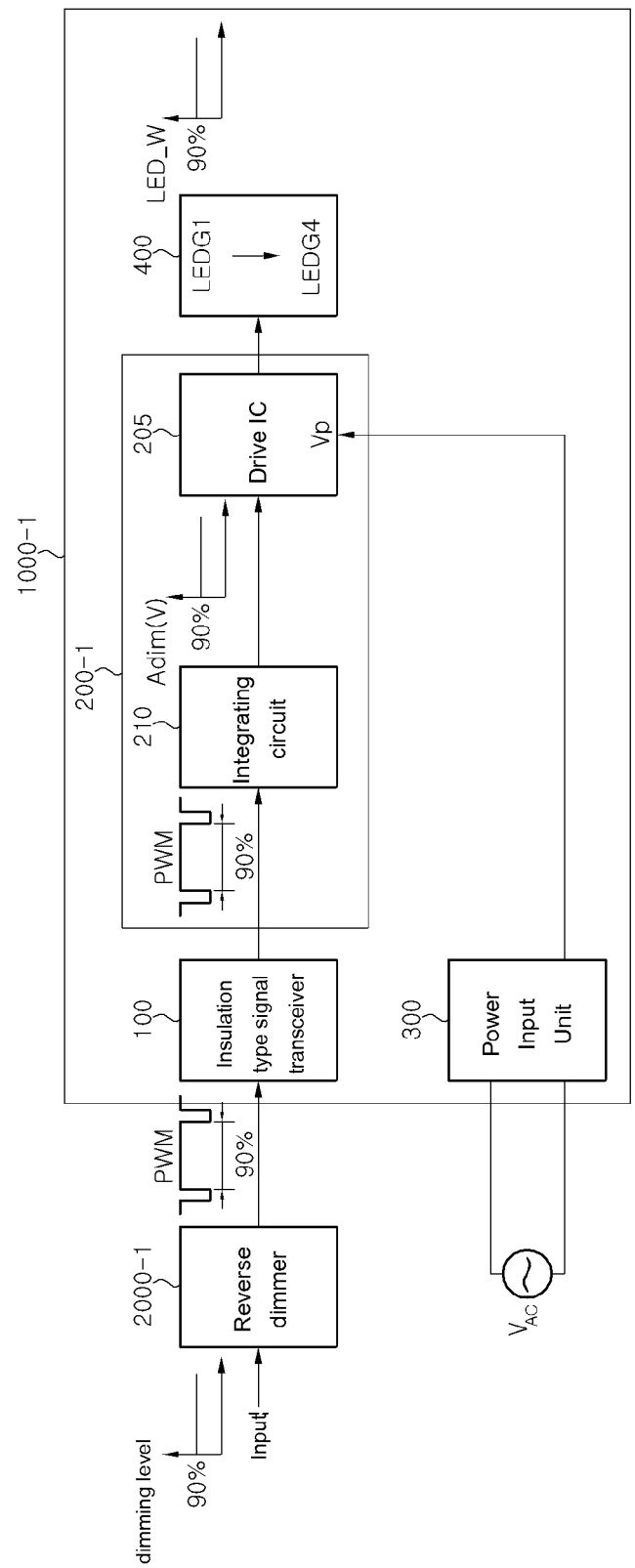

FIG. 8*c* shows a block diagram of the dimmable lighting apparatus according to the exemplary embodiment described above with reference to FIG. 3 and FIG. 4, waveform graphs of input/output signals for each component, and a light output waveform graph of the LED lighting apparatus. As shown in FIG. 8*c*, the PWM dimmer 2000-1 generates and outputs a PWM dimming signal having a duty ratio of 90% to the insulation type signal transceiver 100, when a user selects a particular dimming level, for example, a dimming level of 90%. The insulation type signal transceiver 100 is configured to receive and output the PWM dimming signal to the integrating circuit 210, while electrically insulating the PWM dimmer 2000-1 from the drive controller 200 using the photocoupler, as described above. Upon receiving the PWM dimming signal from the insulation type signal transceiver 100, the integrating circuit 210 integrates the PWM dimming signal to obtain an analog dimming signal, which in turn is input to the drive IC 205. As shown therein, the PWM dimming signal having a duty ratio of 90% is converted into an analog dimming signal having a duty ratio of 9V (corresponding to a dimming level of 90%), which in turn is input to the drive IC 205. The drive IC 205 controls light output of the LED groups to 90% according to the received analog dimming signal (that is, a DC voltage of 9V).

Figure 8D:
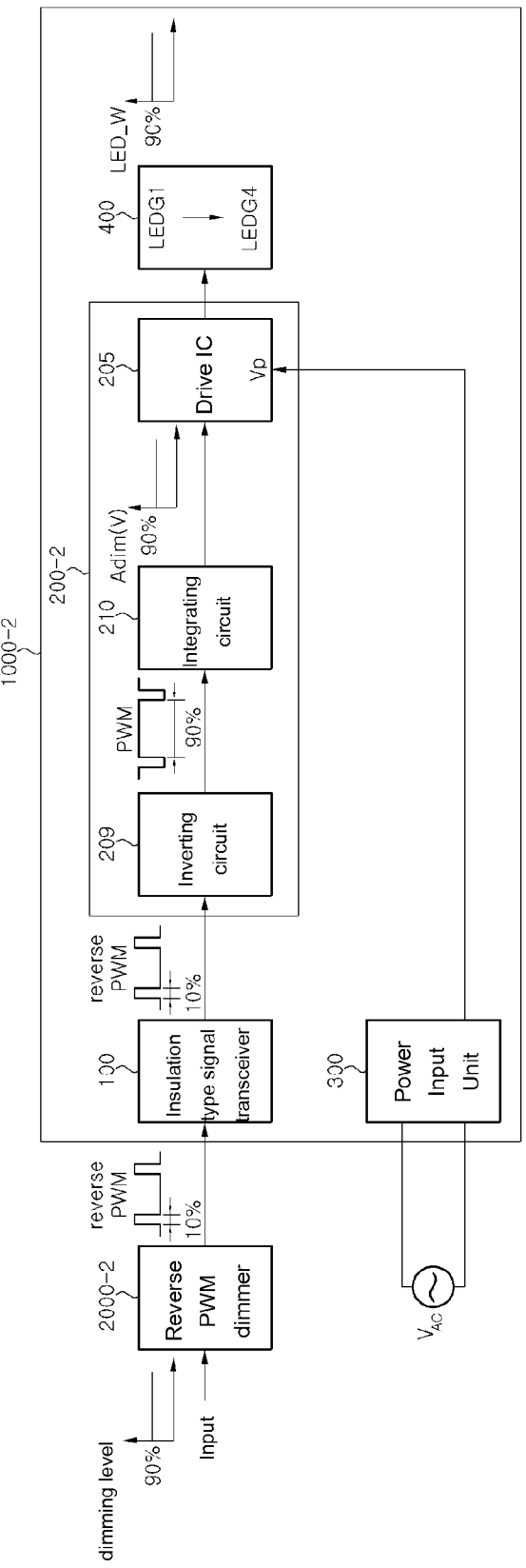

Last, FIG. 8*d* is a block diagram of the dimmable lighting apparatus according to the exemplary embodiment described above with reference to FIG. 5 to FIG. 7, waveform graphs of input/output signals for each component, and a light output waveform graph of the LED lighting apparatus. As shown in FIG. 8*d*, the PWM dimmer 2000-2 generates and outputs a reverse PWM dimming signal having a duty ratio of 10% to the insulation type signal transceiver 100, when a user selects a particular dimming level, for example, a dimming level of 90%. The insulation type signal transceiver 100 is configured to receive and output the reverse PWM dimming signal to the inverting circuit 209. As shown in FIG. 8*d*, the inverting circuit 209 generates a PWM dimming signal having a duty ratio of 90% by reinverting a reverse PWM dimming signal having a duty ratio of 10% and outputs the reinverted PWM dimming signal to the integrating circuit 210. Then, upon receiving the PWM dimming signal from the inverting circuit 209, the integrating circuit 210 integrates the PWM dimming signal to provide an analog dimming signal, which in turn is input to the drive IC 205. As shown therein, the PWM dimming signal having a duty ratio of 90% is converted into an analog dimming signal of 9V (corresponding to a dimming level of 90%), which in turn is input to the drive IC 205. The drive IC 205 controls light output of the LED groups to 90% according to the received analog dimming signal (that is, a DC voltage of 9V).

Figure 9:
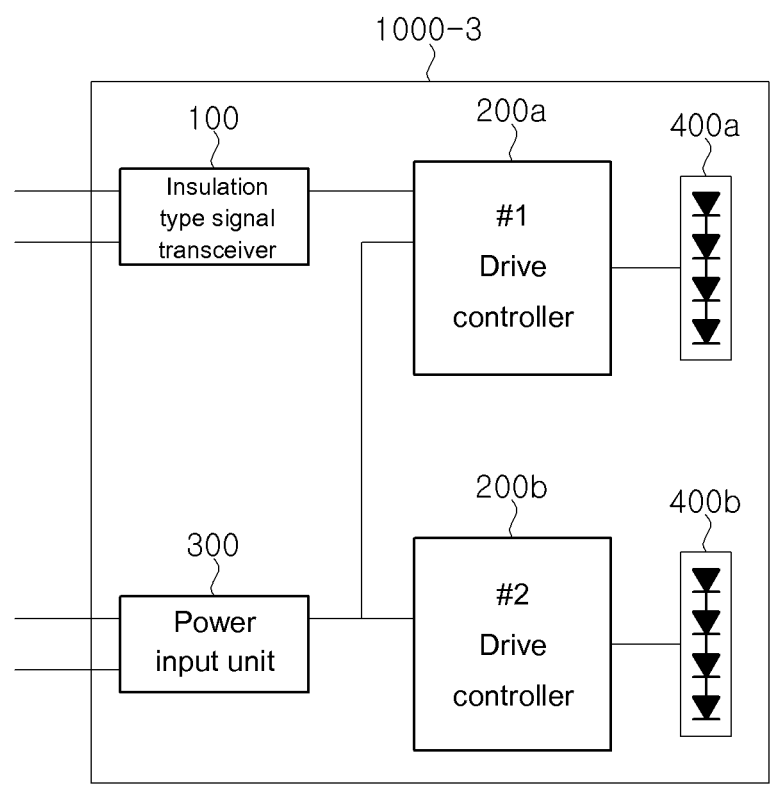
FIG. 9 is a schematic block diagram of a lighting apparatus including two lighting modules according to one exemplary embodiment of the invention.

Features and Functions of LED Lighting Apparatus 1000-3 Including Plural Lighting Modules FIG. 9 is a schematic block diagram of a lighting apparatus including two lighting modules according to one exemplary embodiment of the invention and FIG. 10 is a circuit diagram of the lighting apparatus including two lighting modules according to the exemplary embodiment of the invention. Hereinafter, the features and functions of the LED lighting apparatus 1000-3 according to this exemplary embodiment will be described with reference to FIG. 9 and FIG. 10.

First, the LED lighting apparatus 1000-3 according to this exemplary embodiment is a dimmable lighting apparatus that receives a dimming signal and AC voltage and outputs light having various illuminances according to a dimming level. The LED lighting apparatus 1000-3 according to this exemplary embodiment includes a plurality of lighting modules having different color temperatures, in which some lighting modules allow dimming control and the other lighting modules do not allow dimming control, whereby the lighting apparatus can emit light having various color temperatures through a dimming function. To this end, as shown in FIG. 9 and FIG. 10, the LED lighting apparatus 1000-3 may include an insulation type signal transceiver 100, a power input unit 300, a first lighting module, which may include a first drive controller 200*a* and a first light emitting unit 400*a*, and a second lighting module, which may include a second drive controller 200*b* and a second light emitting unit 400*b*. Although the LED lighting apparatus 1000-3 is illustrated as including two lighting modules in FIG. 9 and FIG. 10, it will be apparent to those skilled in the art that the present invention is not limited thereto and the number of lighting modules may vary as needed.

In the LED lighting apparatus 1000-3 according to this exemplary embodiment, the insulation type signal transceiver 100, the power input unit 300, and the first drive controller 200*a* and the first light emitting unit 400*a* of the first lighting module have the same features and functions as those of the insulation type signal transceiver 100, the power input unit 300, the drive controller 200-1, and the plurality of LED groups 400 of the LED lighting apparatus 1000-1, and thus detailed descriptions thereof will be omitted. Hereinafter, among the components of the LED lighting apparatus 1000-3, the second lighting module will be described in detail.

Features and Functions of Second Lighting Module

Referring to FIG. 9 and FIG. 10, the second lighting module of the lighting apparatus 1000-3 according to this exemplary embodiment is configured to output light upon receiving drive voltage Vp from the power input unit 300. To this end, the second lighting module may include the second drive controller 200*b* and the second light emitting unit 400*b*.

The second drive controller 200*b* according to this exemplary embodiment receives only the drive voltage Vp from the power input unit 300 to control sequential driving of light emitting diodes of the second light emitting unit 400*b* without receiving a PWM dimming signal. To this end, the second drive controller 200*b* may include a second drive IC 205*b*.

The second drive IC 205*b* controls LED drive current $I_{LED}$ such that the light emitting diodes are maintained to operate at maximum illuminance.

The second light emitting unit 400*b* according to the exemplary embodiment may include a plurality of LED groups, which are sequentially turned on or off under control of the second drive controller 200*b*. Although the second light emitting unit 400b is illustrated as including four LED groups 401b~404b in FIG. 9 and FIG. 10, it will be apparent to those skilled in the art that the present invention is not limited thereto and the number of LED groups in the second light emitting unit 400b may vary as needed.

According to the exemplary embodiment, the first light emitting unit 400a and the second light emitting unit 400b may be composed of combinations of different color temperatures. More specifically, the color temperature of the light emitting diodes included in the first light emitting unit may be warm white in the range of 2500K to 3200K, and the color temperature of the light emitting diodes included in the second light emitting unit may be cool white in the range of 6000K to 9000K, without being limited thereto. Since, the first light emitting unit 400a allows dimming control while the second light emitting unit 400b does not, the LED apparatus 1000-3 according to this exemplary embodiment can adjust color temperature of light as well as illuminance by dimming control.

Features and Functions of Smart Illumination System

Figure 11:
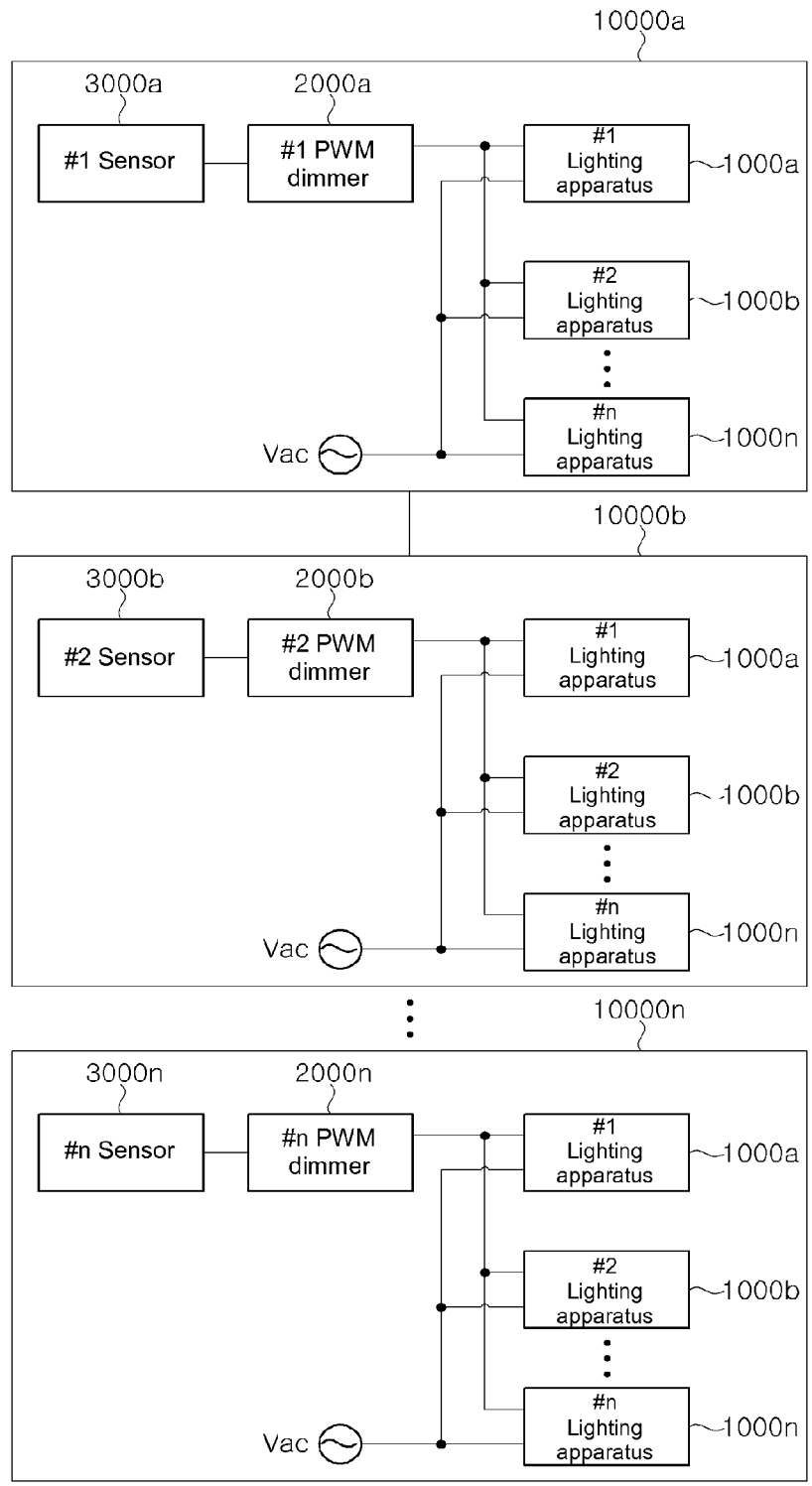
FIG. 11 is a schematic block diagram of a smart illumination system allowing individual dimming control according to one exemplary embodiment of the invention.

FIG. 11 is a schematic block diagram of a smart illumination system allowing individual dimming control according to one exemplary embodiment of the invention. Hereinafter, the features and functions of the smart illumination system will be generally described with reference to FIG. 11.

First, the smart illumination system according to the exemplary embodiment includes one or more sensor units 3000a~3000n, one or more dimming units 2000a~2000n connected to each of the sensor units, and one or more lighting modules 1000a~1000n connected to each of the dimming units.

According to this exemplary embodiment, the sensor units 3000a~3000n may include an illuminance sensor for detecting surrounding light and/or a motion sensor for detecting surrounding motion. In addition, among the sensor units 3000a~3000n, the illuminance sensor outputs a low dimming level with respect to strong surrounding illuminance and a high dimming level with respect to low surrounding illuminance, and the motion sensor outputs a high dimming level with respect to adjacent surrounding motion and a low dimming level with respect to distant surrounding motion. The dimming levels output from the sensor units 3000a~3000n are input to the dimming units 2000a~2000n that output dimming signals. The sensor units 3000a~3000n may be provided in plural and each of the sensor units 3000a~3000n is connected to a plurality of dimming units 2000a~2000n such that the dimming level is input to the plurality of dimming units 2000a~2000n through one sensor.

According to the exemplary embodiment, the dimming units 2000a~2000n receive the dimming levels from the sensor units 3000a~3000n and output dimming signals to the lighting modules 1000a~1000n. The dimming signals output from the dimming units 2000a~2000n may be PWM dimming signals modulated such that a pulse width of the dimming signal is widened with increasing dimming level. The dimming signals output from the dimming units 2000a~2000n are input to the lighting modules. The plurality of dimming units 2000a~2000n may be connected to one sensor unit 3000a~3000n, and a plurality of lighting modules 1000a~1000n may be connected to one dimming unit 2000a~2000n.

According to the exemplary embodiment, each of the lighting modules 1000a~1000n receives AC voltage and dimming signals output from the dimming units 2000a~2000n, and emits light at stronger illuminance with increasing dimming level through detection of a dimming level based on the dimming signals. According to the exemplary embodiment, each of the lighting modules 1000a~1000n may be provided at an input terminal thereof with a photocoupler that transmits the dimming signals input from the dimming units 2000a~2000n while insulating the lighting modules 1000a~1000n from the dimming units 2000a~2000n. According to one exemplary embodiment, the photocoupler may be composed of a light source and a photodetector, in which the light source converts the received dimming signal into light and the photodetector outputs an electrical signal obtained through conversion of the light, which has been converted from the dimming signal.

The invention claimed is:

1. A dimmable lighting emitting diode (LED) lighting apparatus comprising:
a power input unit generating drive voltage through rectification of received alternating current (AC) power and outputting the generated drive voltage to a drive controller;
an insulation type signal transceiver receiving a pulse width modulation (PWM) signal output from a PWM dimmer and outputting the PWM signal to the drive controller, while electrically insulating the PWM dimmer from the drive controller;
a first LED group to an nth LED group, n being a positive integer of 2 or greater, receiving the drive voltage and sequentially operating under control of the drive controller; and
the drive controller comprising an integrating circuit, the drive controller controlling sequential operation of the first LED group to the nth LED group according to a voltage level of the drive voltage, determining a dimming level based on the received PWM dimming signal, and controlling dimming of the first LED group to the nth LED group based on the determined dimming level.

2. The dimmable LED lighting apparatus according to claim 1, wherein the integrating circuit receives the PWM dimming signal and outputs a dimming signal detected through integration of the received PWM dimming signal for a pulse period, and the drive controller determines the dimming level based on an average voltage of the detected dimming signal.

3. The dimmable LED lighting apparatus according to claim 1, wherein the insulation type signal transceiver comprises a light source outputting light obtained through conversion of the PWM dimming signal from the PWM dimmer, and a photodetector outputting an electrical signal obtained through conversion of the PWM dimming signal received in the form of light.

4. The dimmable LED lighting apparatus according to claim 3, wherein the insulation type signal transceiver further comprises a constant current control device maintaining current supplied to the light source at a constant level.

5. A dimmable light emitting diode (LED) lighting apparatus comprising:
a power input unit generating drive voltage through rectification of received alternating current (AC) power and outputting the generated drive voltage to a drive controller;
an insulation type signal transceiver receiving a pulse width modulation (PWM) signal output from a PWM dimmer and outputting the PWM signal to the drive controller, while electrically insulating the PWM dimmer from the drive controller;

a first LED group to an nth LED group, n being a positive integer of 2 or greater, receiving the drive voltage and sequentially operating under control of the drive controller; and the drive controller controlling sequential operation of the first LED group to the nth LED group according to a voltage level of the drive voltage, determining a dimming level based on the received PWM dimming signal, and controlling dimming of the first LED group to the nth LED group based on the determined dimming level, wherein the insulation type signal transceiver further comprises a reverse voltage protection diode protecting the LED lighting apparatus from reverse voltage applied thereto.

6. The dimmable LED lighting apparatus according to claim 1, wherein the insulation type signal transceiver further comprises a noise filter that filters high frequency noise from the received PWM dimming signal.

7. A dimmable light emitting diode (LED) lighting system comprising:
  a pulse width modulation (PWM) dimmer receiving a dimming level and outputting a PWM dimming signal; and
  a plurality of dimmable LED lighting apparatuses according to claim 1, the dimmable LED lighting apparatuses being connected to the PWM dimmer.

8. A dimmable light emitting diode (LED) lighting apparatus comprising:
  a reverse pulse width modulation (PWM) dimmer receiving a dimming level and outputting a reverse PWM dimming signal by inverting the received dimming level;
  a power input unit generating drive voltage through rectification of received alternating current (AC) power and outputting the generated drive voltage to a drive controller;
  an insulation type signal transceiver receiving the reverse PWM dimming signal and outputting the reverse PWM dimming signal to the drive controller, while electrically insulating the reverse PWM dimmer from the drive controller;
  a first LED group to an nth LED group, n being a positive integer of 2 or greater, receiving the drive voltage and sequentially operating under control of the drive controller; and
  the drive controller controlling sequential operation of the first LED group to the nth LED group according to a voltage level of the drive voltage, reinverting the received reverse PWM dimming signal into a PWM dimming signal, determining a dimming level based on the PWM dimming signal, and controlling dimming of the first LED group to the nth LED group based on the determined dimming level.

9. The dimmable LED lighting apparatus according to claim 8, wherein the drive controller comprises an inverting circuit outputting the PWM dimming signal by re-inverting the received reverse PWM dimming signal.

10. The dimmable LED lighting apparatus according to claim 9, wherein the inverting circuit comprises a pull-up resistor and a clamping diode.

11. The dimmable LED lighting apparatus according to claim 9, wherein the inverting circuit comprises an inverting amplifier.

12. The dimmable LED lighting apparatus according to claim 8, wherein the drive controller comprises an integrating circuit receiving the PWM dimming signal and outputting a dimming signal detected through integration of the received PWM dimming signal for a pulse period, and the drive controller determines the dimming level based on an average voltage of the detected dimming signal.

13. The dimmable LED lighting apparatus according to claim 8, wherein the insulation type signal transceiver comprises a light source outputting light obtained through conversion of the reverse PWM dimming signal from the reverse PWM dimmer, and a photodetector outputting an electrical signal obtained through conversion of the reverse PWM dimming signal received in the form of light.

14. The dimmable LED lighting apparatus according to claim 8, wherein the insulation type signal transceiver further comprises a noise filter that filters high frequency noise from the received reverse PWM dimming signal.

15. The dimmable LED lighting apparatus according to claim 13, wherein the insulation type signal transceiver further comprises a constant current control device maintaining current supplied to the light source at a constant level.

16. The dimmable LED lighting apparatus according to claim 15, wherein the insulation type signal transceiver further comprises a reverse voltage protection diode protecting the LED lighting apparatus from reverse voltage applied thereto.

17. A dimmable light emitting diode (LED) lighting apparatus comprising:
  a power input unit generating drive voltage through rectification of received alternating current (AC) power and outputting the generated drive voltage to a first lighting module and a second lighting module;
  an insulation type signal transceiver receiving a pulse width modulation (PWM) dimming signal output from a PWM dimmer and outputting the PWM dimming signal to the first lighting module, while electrically isolating the PWM dimmer from the first lighting module;
  the first lighting module receiving the drive voltage and the PWM dimming signal to perform illumination based on a dimming level, the first lighting module comprising:
    a first light emitting unit comprising one or more LED groups; and
    a first drive controller comprising an integrating circuit, the first drive controller sequentially driving the one or more LED groups of the first light emitting unit according to a voltage level of the received drive voltage, determining the dimming level based on the PWM dimming signal, and controlling dimming of the one or more LED groups of the first light emitting unit based on the determined dimming level; and
  the second lighting module receiving the drive voltage to perform illumination, the second lighting module comprising:
    a second light emitting unit comprising one or more LED groups; and
    a second drive controller comprising an integrating circuit, the second drive controller sequentially driving the one or more LED groups of the second light emitting unit according to a voltage level of the received drive voltage.

18. The dimmable LED lighting apparatus according to claim 17, wherein the integrating circuit receives the PWM dimming signal and outputs a dimming signal detected through integration of the received PWM dimming signal for a pulse period, and the first drive controller determines the dimming level based on an average voltage of the detected dimming signal.

19. The dimmable LED lighting apparatus according to claim 17, wherein a color temperature of the one or more LED groups of the first light emitting unit is different from that of the one or more LED groups of the second light emitting unit.

20. The dimmable LED lighting apparatus according to claim 17, wherein the insulation type signal transceiver comprises a light source outputting light obtained through conversion of the PWM dimming signal from the PWM dimmer, and a photodetector outputting an electrical signal obtained through conversion of the PWM dimming signal received in the form of light.

21. The dimmable LED lighting apparatus according to claim 17, wherein the insulation type signal transceiver further comprises a noise filter that filters high frequency noise from the received PWM dimming signal.

22. The dimmable LED lighting apparatus according to claim 20, wherein the insulation type signal transceiver further comprises a constant current control device maintaining current supplied to the light source at a constant level.

23. A dimmable light emitting diode (LED) lighting apparatus comprising:
- a power input unit generating drive voltage through rectification of received alternating current (AC) power and outputting the generated drive voltage to a first lighting module and a second lighting module;
- an insulation type signal transceiver receiving a pulse width modulation (PWM) dimming signal output from a PWM dimmer and outputting the PWM dimming signal to the first lighting module, while electrically isolating the PWM dimmer from the first lighting module;
- the first lighting module receiving the drive voltage and the PWM dimming signal to perform illumination based on a dimming level; and
- the second lighting module receiving the drive voltage to perform illumination,
- wherein the insulation type signal transceiver further comprises a reverse voltage protection diode protecting the LED lighting apparatus from reverse voltage applied thereto.

* * * * *